US011126008B2

(12) United States Patent
Momonoi

(10) Patent No.: US 11,126,008 B2
(45) Date of Patent: Sep. 21, 2021

(54) 3D IMAGE DISPLAY APPARATUS, 3D IMAGE DISPLAY METHOD, AND 3D IMAGE GENERATING AND DISPLAYING SYSTEM

(71) Applicant: Samsung Electronics Co., Ltd., Suwon-si (KR)

(72) Inventor: Yoshiharu Momonoi, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/800,452

(22) Filed: Feb. 25, 2020

(65) Prior Publication Data

US 2020/0271948 A1 Aug. 27, 2020

(30) Foreign Application Priority Data

Feb. 27, 2019 (JP) ............................... JP2019-33509
Oct. 3, 2019 (JP) ............................. JP2019-182807
Jan. 31, 2020 (KR) ........................ 10-2020-0012195

(51) Int. Cl.
*G02B 30/30* (2020.01)
*G02B 30/32* (2020.01)
(Continued)

(52) U.S. Cl.
CPC ............. *G02B 30/32* (2020.01); *G02B 30/29* (2020.01); *H04N 13/207* (2018.05);
(Continued)

(58) Field of Classification Search
CPC .................................................... G09F 19/125
See application file for complete search history.

(56) References Cited

U.S. PATENT DOCUMENTS

| 5,880,704 A | 3/1999 | Takezaki |
| 7,719,621 B2 | 5/2010 | Tsuboi et al. |
| (Continued) | | |

FOREIGN PATENT DOCUMENTS

| CN | 107515476 A | 12/2017 |
| JP | 7-092936 A | 4/1995 |
| (Continued) | | |

OTHER PUBLICATIONS

International Search Report with Written Opinion dated Jun. 29, 2020; International Appln. No. PCT/KR2020/002705.

*Primary Examiner* — Roy P Rabindranath
(74) *Attorney, Agent, or Firm* — Jefferson IP Law, LLP

(57) ABSTRACT

A three-dimensional (3D) image display apparatus, a 3D image display method, and a 3D image generating and displaying system are provided. The 3D image display apparatus includes a display displaying a plurality of element images, an exit pupil array controlling directions of rays that exit from the plurality of element images, an active shutter configured to transmit or block rays through each of the exit pupils, and a processor configured to generate the plurality of element images from a multi-viewpoint image group, arrange each of the plurality of element images on an expanded region including a first region corresponding to a first exit pupil for rays transmitted by the active shutter and a second region corresponding to a second exit pupil for rays blocked by the active shutter, and synchronously display the plurality of element images on the display while transmitting or blocking of the rays.

19 Claims, 33 Drawing Sheets

(51) Int. Cl.
*G02B 30/29* (2020.01)
*H04N 13/31* (2018.01)
*H04N 13/305* (2018.01)
*H04N 13/207* (2018.01)

(52) U.S. Cl.
CPC ........... *H04N 13/305* (2018.05); *H04N 13/31* (2018.05); *H04N 2213/001* (2013.01)

(56) References Cited

U.S. PATENT DOCUMENTS

| | | | |
|---|---|---|---|
| 9,638,924 B2 | 5/2017 | Asai et al. | |
| 2003/0151603 A1* | 8/2003 | Kobayashi | G02B 30/27 345/419 |
| 2006/0238863 A1* | 10/2006 | Saishu | G09G 3/3611 359/472 |
| 2010/0165221 A1 | 7/2010 | Krijn et al. | |
| 2013/0182319 A1 | 7/2013 | Chung | |
| 2013/0215504 A1* | 8/2013 | Kim | H04N 13/332 359/464 |
| 2016/0132025 A1 | 5/2016 | Taff et al. | |
| 2016/0234480 A1* | 8/2016 | Lee | H04N 13/327 |
| 2017/0155891 A1* | 6/2017 | Hu | G02B 30/00 |
| 2019/0054379 A1* | 2/2019 | Ackley | A63F 13/27 |
| 2019/0121149 A1 | 4/2019 | Liu | |
| 2019/0204494 A1* | 7/2019 | Zhao | G02B 6/0043 |

FOREIGN PATENT DOCUMENTS

| | | |
|---|---|---|
| JP | 2002-330452 A | 11/2002 |
| JP | 2003-043413 A | 2/2003 |
| JP | 2004-198971 A | 7/2004 |
| JP | 2008-015188 A | 1/2008 |
| JP | 4218937 B2 | 11/2008 |
| JP | 2009-031692 A | 2/2009 |
| JP | 4256597 B2 | 2/2009 |
| JP | 2009-204930 A | 9/2009 |
| JP | 2012-008298 A | 1/2012 |
| JP | 6358494 B2 | 6/2018 |
| KR | 10-2012-0022560 A | 3/2012 |
| KR | 10-2019-0002242 A | 1/2019 |

* cited by examiner

3D IMAGE DISPLAY APPARATUS, 3D IMAGE DISPLAY METHOD, AND 3D IMAGE GENERATING AND DISPLAYING SYSTEM

CROSS-REFERENCE TO RELATED APPLICATIONS

This application is based on and claims priority under 35 U.S.C. § 119(a) of a Japanese patent application number 2019-033509, filed on Feb. 27, 2019, in the Japanese Intellectual Property Office, of a Japanese patent application number 2019-182807, filed on Oct. 3, 2019, in the Japanese Intellectual Property Office, and of a Korean patent application number 10-2020-0012195, filed on Jan. 31, 2020, in the Korean Intellectual Property Office, the disclosures of each of which are incorporated by reference herein in their entireties.

BACKGROUND

1. Field

The disclosure relates to an apparatus for displaying a three-dimensional (3D) image, a method of displaying a 3D image, and a system for generating and displaying a 3D image.

2. Description of Related Art

A method of watching a three-dimensional (3D) image using an integral photography method has been known. For example, Patent Document 1 discloses, in order to address an issue about narrow viewing zone in which a 3D image may be observed, a 3D image display apparatus using an integral photography allows a user to observe the 3D image from side lobes, not a main lobe, by arranging a display on a plane and making a group of rays slanted towards an observing direction with respect to a direction perpendicular to the plane.

The above information is presented as background information only to assist with an understanding of the disclosure. No determination has been made, and no assertion is made, as to whether any of the above might be applicable as prior art with regard to the disclosure.

PRIOR ART DOCUMENTS

Patent Documents

[Patent Document 1] Japanese Patent Application Publication No. 2003-43413.

SUMMARY

Patent Document 1 discloses configurations of correcting a multi-viewpoint image displayed on a display by monotonically expanding the multi-viewpoint image with respect to an observation direction as a distance from an observer increases, not forming a distorted three-dimensional (3D) image by using a liquid crystal blind, and sharing a 3D image displayed in a time-divisional manner with a plurality of other people.

However, even when the technique disclosed in Patent Document 1 is used, a viewing zone itself of each person is restricted.

Aspects of the disclosure are to address at least the above-mentioned problems and/or disadvantages and to provide at least the advantages described below. Accordingly, an aspect of the disclosure is to provide a 3D image display apparatus capable of expanding a viewing zone, a 3D image display method, and a 3D image generating and displaying system.

The technical goal of the disclosure is not limited thereto, and other technical goals may exist.

Additional aspects will be set forth in part in the description which follows and, in part, will be apparent from the description, or may be learned by practice of the presented embodiments of the disclosure.

In accordance with an aspect of the disclosure, a 3D image display apparatus is provided. The apparatus includes a display displaying a plurality of element images, an exit pupil array including a plurality of exit pupils arranged two-dimensionally above the display, the exit pupil array controlling directions of rays exit from the plurality of element images, an active shutter arranged on or under the exit pupil array, and configured to transmit or block rays through each of the exit pupils, and a processor configured to generate the plurality of element images from a multi-viewpoint image group and thus arrange the plurality of element images to correspond to the exit pupils, and synchronize displaying of the element images on the display with transmitting or blocking of the rays by the active shutter, wherein the processor is configured to arrange each of the plurality of element images on an expanded region including a region corresponding to an exit pupil through which the ray is transmitted by the active shutter and a region corresponding to an exit pupil that blocks the ray by the active shutter.

The active shutter may be further configured to block the ray from at least one of every column or every row of the plurality of exit pupils.

The display may include a display area displaying the plurality of element images, the plurality of element images each may include a plurality of partial element images, and the processor may be further configured to arrange the plurality of partial element images to correspond to a plurality of 3D image observing areas, in which a user observes a 3D image while looking down in a direction substantially perpendicular to a side of the display area.

The processor may be further configured to arrange the plurality of partial element images according to an aspect ratio of the display area.

Each of the partial element images may include a triangular shape or a rectangular shape.

The exit pupils may be each a regular hexagon shape, and the exit pupil array may include a honeycomb structure including the exit pupils.

The exit pupil array may include a micro-lens array in which micro-lenses are arranged.

A radius of curvature in each of the micro-lenses and a pitch of the micro-lenses may be equal to each other.

The micro-lenses may be flat convex lenses, the radius of curvature r of the micro-lens may satisfy an equation $r = d/(1+Pp/L_p) \times (n-1)$, where d denotes a distance between the micro-lens and a pixel, Pp denotes a pixel pitch, $L_p$ denotes a micro-lens pitch, and n denotes a refractive index of the micro-lens.

The exit pupil array may include a pin-hole array in which pin holes are arranged.

A diameter of each of the pin holes and a pitch of the pin holes may be substantially equal to each other.

An area of the exit pupil array may be substantially equal to an area of the display area in the display.

A pitch of a region blocking the ray in the active shutter may be equal to or less than the pitch of the exit pupil.

A width of the element image arranged on the expanded region may correspond to a length of odd number pixels included in the display.

A transverse width of the element image arranged on the expanded region may correspond to a length of odd number pixels included in the display.

Each of pixels included in the display may include sub-pixels that are configured to represent colors, and the plurality of exit pupils may be configured to allow all of the sub-pixels of a pixel corresponding to the exit pupil to be observed at a predetermined viewing distance.

The active shutter may be further configured to block the exit pupil next to the exit pupil that transmits the ray.

In accordance with another aspect of the disclosure, a 3D image display method of a 3D image display apparatus is provided. The apparatus includes a display displaying a plurality of element images, an exit pupil array including a plurality of exit pupils two-dimensionally arranged above the display, the exit pupil array controlling directions of rays exit from the plurality of element images, and an active shutter arranged on or under the exit pupil array and configured to transmit or block the ray through each of the plurality of exit pupils, includes generating the plurality of element images from a multi-viewpoint image group and arranging the plurality of element images on a expanded region including a region corresponding to an exit pupil through which the ray is transmitted by the active shutter and a region corresponding to an exit pupil that blocks the ray by the active shutter, and synchronizing displaying of the plurality of element images on the display with the transmitting or blocking of the rays from the element images by the active shutter.

In accordance with another aspect of the disclosure, a 3D image generating and displaying system is provided. The system includes a 3D image display apparatus, and a plurality of imaging apparatuses configured to capture a multi-viewpoint image group, wherein the 3D image display apparatus includes a display displaying a plurality of element images, an exit pupil array including a plurality of exit pupils arranged two-dimensionally above the display, the exit pupil array controlling directions of rays exit from the plurality of element images, an active shutter arranged on or under the exit pupil array and configured to transmit or block rays through each of the exit pupils, and a processor configured to generate the plurality of element images from a multi-viewpoint image group and thus arrange the plurality of element images to correspond to the exit pupils, and synchronize displaying of the element images on the display with transmitting or blocking of the rays by the active shutter, wherein the processor is further configured to arrange each of the plurality of element images on a expanded region including a region corresponding to an exit pupil through which the ray is transmitted by the active shutter and a region corresponding to an exit pupil that blocks the ray by the active shutter.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terminology used herein will be described briefly, and the disclosure will be described in detail.

It will be understood that although the terms "first" and "second" are used herein to describe various elements, these elements should not be limited by these terms. Terms are only used to distinguish one element from other elements.

An expression used in the singular encompasses the expression of the plural, unless it has a clearly different meaning in the context. Throughout the specification, when a portion "includes" an element, another element may be further included, rather than excluding the existence of the other element, unless otherwise described. When a layer, a film, a region, or a panel is referred to as being "on" another element, it may be directly on/under/at left/right sides of the other layer or substrate, or intervening layers may also be present.

In addition, the terms such as " . . . unit", etc. provided herein indicates a unit performing at least one function or operation, and may be realized by hardware, software, or a combination of hardware and software.

Throughout the disclosure, the expression "at least one of a, b or c" indicates only a, only b, only c, both a and b, both a and c, both b and c, all of a, b, and c, or variations thereof.

A three-dimensional (3D) image display apparatus and a 3D image display method according to an embodiment of the disclosure will be described below.

Figure 1:
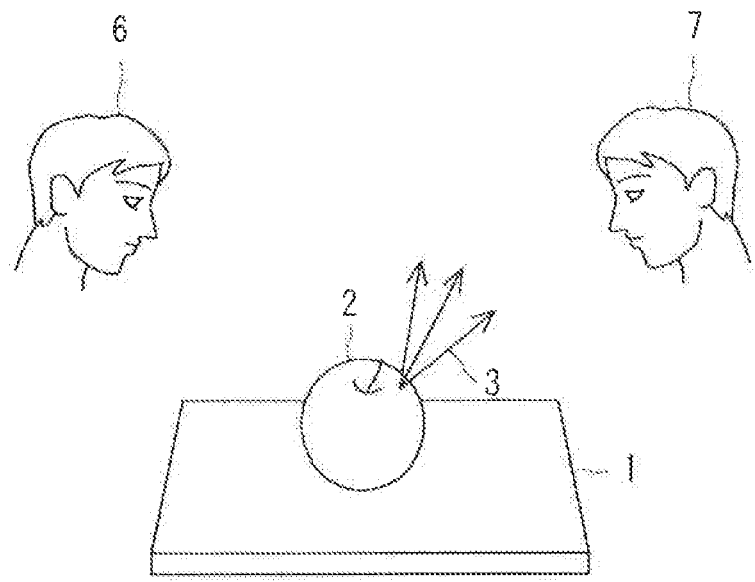
FIG. 1 is a diagram illustrating a method of observing a three-dimensional (3D) image according to an embodiment of the disclosure.

FIG. 1 is a diagram illustrating a method of observing a 3D image according to an embodiment of the disclosure.

Referring to FIG. 1, users 6 and 7 look down a 3D image 2 of an object (e.g., an apple) displayed on a 3D image display apparatus 1 in a comfortable position within a viewing zone (not shown).

In the specification, based on a vertical direction that is perpendicular to a surface of the 3D image display apparatus 1 (that is, a surface through which light of the 3D image exit), a side closer to the user watching the 3D image than to the object will be defined as 'above the object' and a side farther from the user than the object is defined as 'under the object'.

The 3D image 2 consists of set of rays 3 from the 3D image display apparatus 1. A human being perceives depth due to a binocular parallax that occurs when looking at an object with both eyes, that is, a difference between retinal images of left and right eyes. Also, a human being perceives the depth according to a motion parallax, that is, a change in a retinal image caused by relative movement of an observer and the object. Therefore, the users 6 and 7 may observe the 3D image 2.

The users 6 and 7 may observe different 3D images 2 from respective positions as they move their heads upward, downward, left, and right within the viewing zone. FIG. 1 shows the users 6 and 7 facing each other, and the users 6 and 7 may observe different 3D images from each other because they observe the 3D image from different directions. For example, when a card is displayed as a 3D image, the users 6 and 7 may respectively observe a drawing surface of their own hands, but may not observe the drawing surface of opponent's hand. As described later, because the 3D image display apparatus 1 has four viewing zones, four users may simultaneously observe the 3D image display apparatus 1 from four directions.

Figure 2:
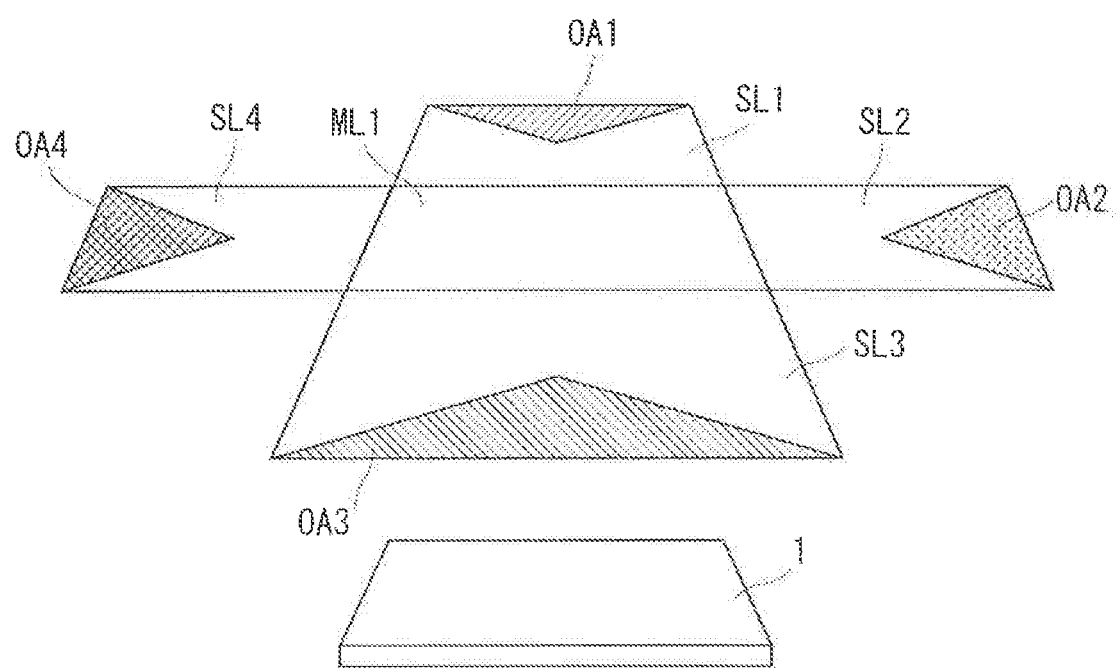
FIG. 2 is a diagram for describing a viewing zone according to an embodiment of the disclosure.

FIG. 2 is a diagram for describing a viewing zone according to an embodiment of the disclosure.

Referring to FIG. 2, it may be understood as a drawing in which the 3D image display apparatus 1 and the viewing zones are seen from an inclined direction.

Figure 3:
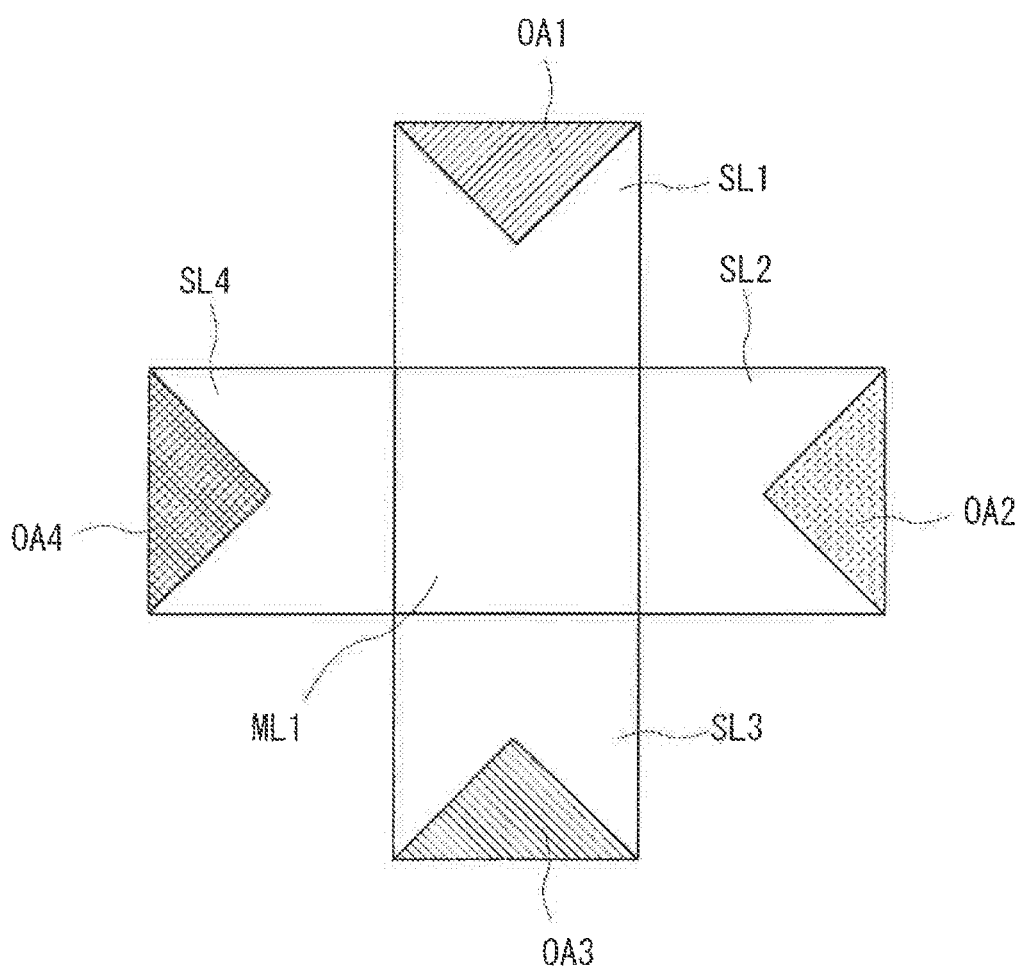
FIG. 3 is a diagram for describing a viewing zone according to an embodiment of the disclosure.

FIG. 3 is a diagram for describing a viewing zone according to an embodiment of the disclosure.

Referring to FIG. 3, it may be understood as a drawing showing the viewing zone seen from above.

Referring to FIGS. 2 and 3, a viewing zone, e.g., a main lobe ML1, is formed in a perpendicular direction (normal direction) of the 3D image display apparatus 1, and viewing zones including side lobes SL1, SL2, SL3, and SL4 are formed around the main lobe ML1. Although side lobes are also formed in a diagonal direction of the main lobe ML1, disclosure and descriptions thereof are omitted.

A user may observe 3D images that are different from one another and are not distorted from four areas OA1, OA2, OA3, and OA4 (hereinafter, referred to as "3D image observing area") that are expressed as triangles in the side lobes SL1 to SL4. Also, when the user wants to observe the 3D image from other regions than the 3D image observing areas in the side lobes SL1 to SL4, the user may observe a different 3D image from an originally intended image. Hereinafter, when one of the plurality of 3D image observing areas OA1 to OA4 is not specified, it will be referred to as a 3D image observing area OA.

According to the 3D image display apparatus 1 and a 3D image display method of the embodiment of the disclosure, the main lobe ML1 and the side lobes SL1 to SL4 are greater than those of the viewing zones according to the related art, and thus, the 3D image observing areas OA1 to OA4 may be increased.

Next, the 3D image display apparatus 1 and the 3D image display method according to the embodiment of the disclosure will be described below with reference to accompanying drawings.

Figure 4:
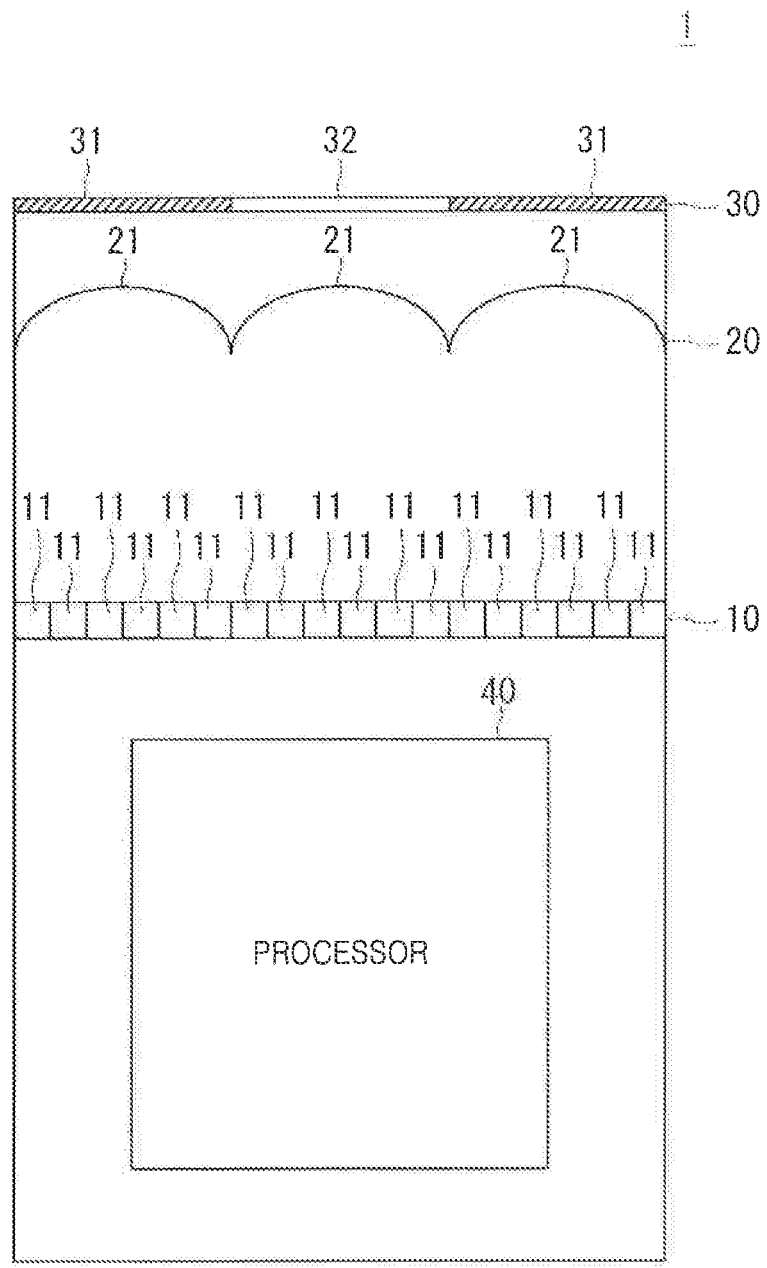
FIG. 4 is a block diagram of a 3D image display apparatus according to an embodiment of the disclosure.

FIG. 4 is a block diagram of the 3D image display apparatus 1 according to an embodiment of the disclosure.

Referring to FIG. 4, the 3D image display apparatus 1 includes a display portion 10, an exit pupil array 20, an active shutter 30, and a processor 40.

The display portion 10 may include, for example, a liquid crystal display (LCD), an organic light-emitting diode (OLED) display, etc. A display area of the display portion 10 may have, for example, a rectangular shape, may include a plurality of pixels 11 (display pixels), and display a plurality of element images that will be described later. An image displayed by the display portion 10 may include a moving picture or a still image.

The exit pupil array 20 is arranged above the display portion 10 and controls exit directions of rays of element images displayed on the display portion 10 in predetermined directions. Here, controlling of the exit directions of the rays by the exit pupil array 20 denotes that a proceeding direction of the ray is determined by an optical structure of the exit pupil array 20.

The exit pupil array 20 according to the embodiment of the disclosure may include a micro-lens array having a plurality of micro-lenses 21 that are arranged two-dimensionally.

Figure 5:
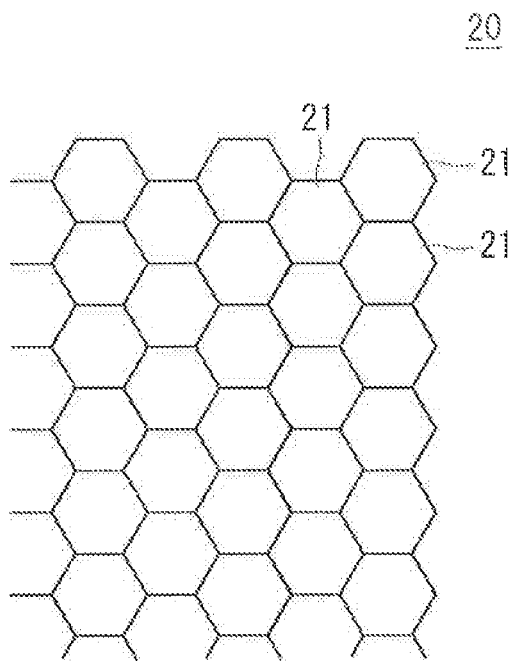
FIG. 5 is a diagram for describing an exit pupil array according to an embodiment of the disclosure.

FIG. 5 is a diagram for describing the exit pupil array 20 according to an embodiment of the disclosure.

Referring to FIG. 5, it may be understood as a drawing that shows the exit pupil array 20 without the active shutter 30 (ray blocking unit) seen from above.

Referring to FIG. 5, the exit pupil array 20 has a honeycomb structure (that is, a hexagonal lattice arrangement) in which the micro-lenses 21 each having a regular hexagonal structure are arranged seamlessly. As such, a density of the micro-lenses 21 may be increased and a resolution of the displayed 3D image may be improved. Also, the viewing zone may be increased by making a radius of curvature and a pitch of the micro-lenses 21 substantially the same and by increasing the power of the micro-lenses 21.

Figure 19:
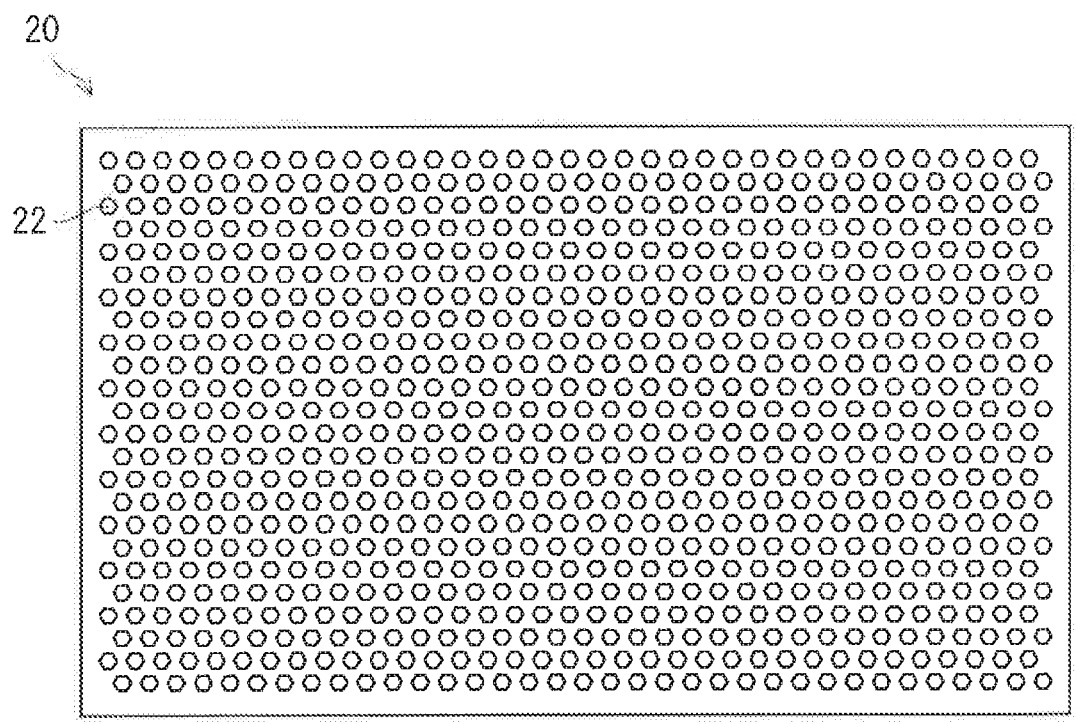
FIG. 19 is a diagram showing an example in which an exit pupil array is executed in a pin-hole array according to an embodiment of the disclosure.

The exit pupil array 20 according to another embodiment of the disclosure may include a pin-hole array in which a plurality of small holes (e.g., pin holes) are arranged two-dimensionally (see FIG. 19). The pin holes may have, for example, hexagonal shapes. The pin holes may form a pin-hole array having a honeycomb structure in which centers of the pin holes form a hexagonal lattice.

The micro-lens array itself or the pin-hole array itself has a small size and may generate parallax in horizontal and vertical directions. Also, the micro-lens and the pin hole may have another shape than the regular hexagonal shape, e.g., a rectangular shape, etc. In the specification, one micro-lens or one pin hole may be referred to as an exit pupil.

The active shutter 30 is above the exit pupil array 20, and time-divisionally transmits or blocks (shields) a ray whenever the ray is emitted from the exit pupil. The active shutter 30 may include, for example, a liquid crystal layer and an electrode applying a voltage to the liquid crystal layer. Here, the term 'active' denotes operating according to an electric control of the processor 40.

Figure 6:
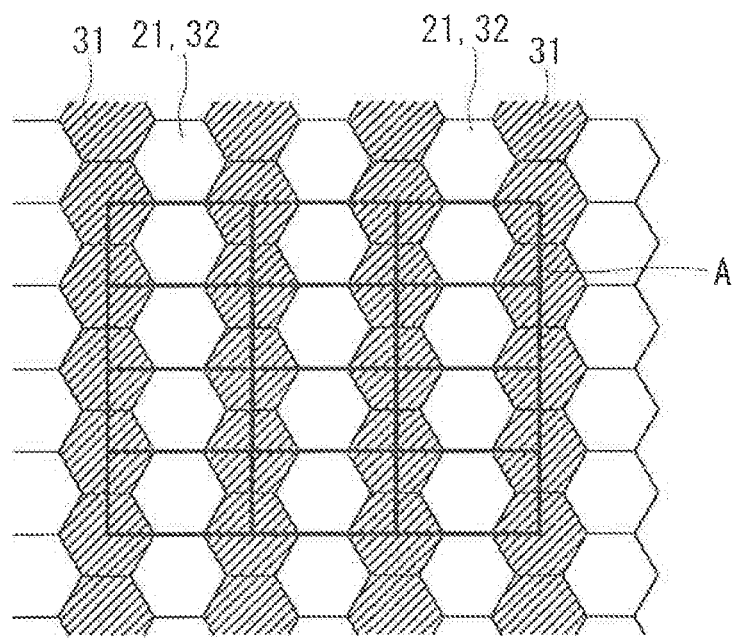
FIG. 6 is a diagram for describing an active shutter according to an embodiment of the disclosure.

FIG. 6 is a diagram for describing the active shutter 30 according to an embodiment of the disclosure.

Referring to FIG. 6, it may be understood as a drawing that shows the active shutter 30 arranged above the exit pupil array 20 seen from above.

Referring to FIG. 6, hatched blocking regions 31 denote regions of blocking the ray by the active shutter 30, and non-hatched transmission regions 32 denote regions of transmitting the ray in the active shutter 30. Also, a thick line A of lattice shape indicates that each of regions surrounded by the thick line A corresponds to a region of an element image corresponding to one micro-lens 21 through which the ray is transmitted by the active shutter 30. However, the thick line A does not actually exist in the active shutter 30.

By providing the active shutter 30 as described above, a region of one element image may be increased from a region corresponding to one micro-lens 21 to a region including the region corresponding to the micro-lens 21 and a region corresponding to a part of the blocking region 31 for blocking the ray (left and right regions of the micro-lens 21 in FIG. 6). As a result, the 3D image display apparatus 1 may expand the main lobe ML1 and the side lobes SL1 to SL4 (that is, the viewing zone).

The active shutter 30 blocks (or transmits) the ray from the display portion 10 for every column of the micro-lenses 21. The active shutter 30 alternately transmits and blocks the ray with respect to one micro-lens 21. For example, the active shutter 30 may repeatedly perform an operation of transmitting the ray for 1/60 second and blocking the next ray for 1/60 second 30 times per second. The time of transmitting or blocking the ray may be further reduced and the number of repetitions per second may be increased.

The displaying on the display portion 10 and the transmitting or blocking of light by the active shutter 30 are synchronized and driven at high speed, and thus, the user may not recognize a change in the blocking area, the number of pixels in the 3D image may be equal to that of the exit pupils, and a resolution that the user feels may not degrade.

In the embodiment of the disclosure, a pitch of the region blocking the ray in the active shutter 30 may be equal to or less than that of the exit pupil. As a result, the light blocking region at the center of the display area in the display portion 10 may substantially coincide with the region of exit pupil, but the light blocking region at the end of the display area may be shifted towards the center portion of the display area rather than the region of the exit pupil. According to the above configuration, the 3D image may be effectively displayed.

In the embodiment of the disclosure, an example in which the active shutter 30 is provided above the exit pupil array 20 is described, but the active shutter 30 may be provided under the exit pupil array 20. Also, an example in which the active shutter 30 is an active shutter made of liquid crystal is described in the embodiment of the disclosure, but a mechanical active shutter may be used as the active shutter 30.

The processor 40 may control overall operations of the 3D image display apparatus 1 by driving an operating system or an application program, and may perform processing of various data including image data and operations. Here, control of the processor 40 may denote that the operations of the 3D image display apparatus 1 are controlled according to an electrical signal of the processor 40.

The processor 40 may generate an element image from a multi-viewpoint image group and arrange the element image on the display area of the display portion 10 by corresponding the element image to the micro-lens 21. Here, as described above, the processor 40 may arrange the element image corresponding to the micro-lens 21, through which the ray is transmitted, on a region including a region corresponding to the micro-lens 21 and a region corresponding to a part of the micro-lens 21 which is adjacent to the above micro-lens 21 and blocking the ray. The method of arranging the element image will be described later.

In addition, as described above, the processor 40 may synchronize the displaying of the element image on the display portion 10 with the transmitting (or blocking) of the ray of the active shutter 30 through each exit pupil.

Each element provided by the processor 40 may be implemented using hardware components, software components, and/or combination of the hardware components and the software components. For example, an operation of generating an element image from the multi-viewpoint image group and arranging the element image on the display area of the display portion 10 is implemented by an element image arranging portion, an operation of synchronizing the display of the element image on the display portion 10 with the transmission (or block) of the ray through each exit pupil of the active shutter 30 may be implemented by a synchronization controller, and the element image arranging portion or the synchronization controller may be implemented using hardware or software, or combination of the hardware and software.

The processor 40 may be implemented by loading a program stored in a storage (not shown) to a main memory device (not shown) and executing the program according to control of a processing device. For example, the processor 40 may be implemented by using one or more generic-purpose processors (e.g., CPU or application processor) or a specific-purpose computer (e.g., embedded processor) such as an arithmetic logic unit (ALU), application specific integrated circuits (ASICs), digital signal processors (DSPs), digital signal processing devices (PSPDs), programmable logic devices (PLDs), micro-computer, micro-processor, or another device capable of executing and responding instructions.

The software may include a computer program, a code, an instruction, or a combination of one or more thereof, for independently or collectively instructing or configuring the processing device to operate as desired.

The software may be implemented as computer programs including instructions stored in a computer-readable storage medium. Examples of the computer-readable storage medium include, for example, semiconductor memory (e.g., mask read-only memory (ROM), programmable ROM (PROM), erasable PROM (EPROM), flash ROM, random access memory (RAM), magnetic storage medium (e.g., floppy disk, hard disk, etc.), magneto-optical recording medium (e.g., magneto-optical disk), optical reading medium (e.g., CD-ROM, CD-R, CD-R/W, digital versatile disc (DVD), etc.). The computer-readable storage medium may also be distributed over network coupled computer systems so that the computer readable code is stored and executed in a distributive manner. For example, the computer-readable storage medium may include a server of a manufacturer, a server of an electronic market, or a storage medium of a relay server that temporarily stores a software program.

The computer-readable storage medium may be provided in the form of a non-transitory storage medium. Here, the term "non-transitory" simply denotes that the storage medium is a tangible device, and does not include a signal, but this term does not differentiate between where data is semi-permanently stored in the storage medium and where the data is temporarily stored in the storage medium.

The program may be supplied to the processor 40 by various types of transitory computer readable media. Examples of the transitory computer-readable recording medium may include electrical signals, optical signals, and electromagnetic waves. The transitory computer-readable recording medium may provide the program to the processor 40 through a wired communication path such as a wire and optical fiber, or a wireless communication path.

The 3D image display apparatus 1 as described above may be implemented in a flat plate shape to expand the viewing zone.

Next, operations of the 3D image display apparatus 1 according to an embodiment of the disclosure, that is, a 3D image display method, will be described below.

When the 3D image display apparatus 1 starts to operate, the processor 40 inputs multi-viewpoint images from the multi-viewpoint image group. The multi-viewpoint image group may include multi-viewpoint images captured by imaging apparatuses that are installed to correspond to respective viewpoints of the 3D image observing areas described above. The processor 40 generates a plurality of element images from the multi-viewpoint image group and arranges the element images to correspond to respective micro-lenses 21.

When the 3D image display apparatus 1 starts to operate, the processor 40 generates a plurality of element images from the multi-viewpoint image group and arranges the element images to correspond to the respective micro-lenses 21.

The multi-viewpoint image group may include images obtained by a multi-viewpoint imaging apparatus group (not shown). The multi-viewpoint imaging apparatus group may include a plurality of cameras installed to correspond respectively to the viewpoints of the 3D image observing areas. Here, the imaging apparatus (or camera) may include an image calculated by a computer to generate images, as well as an imaging apparatus (or camera) that actually captures image. For example, the multi-viewpoint image group may be generated by the computer based on each viewpoint of the 3D image observing areas described above. The data of the multi-viewpoint image group may be stored in a storage (not shown), or may be input to the 3D image display apparatus 1 from the multi-viewpoint imaging apparatus group or an external device.

Figure 7:
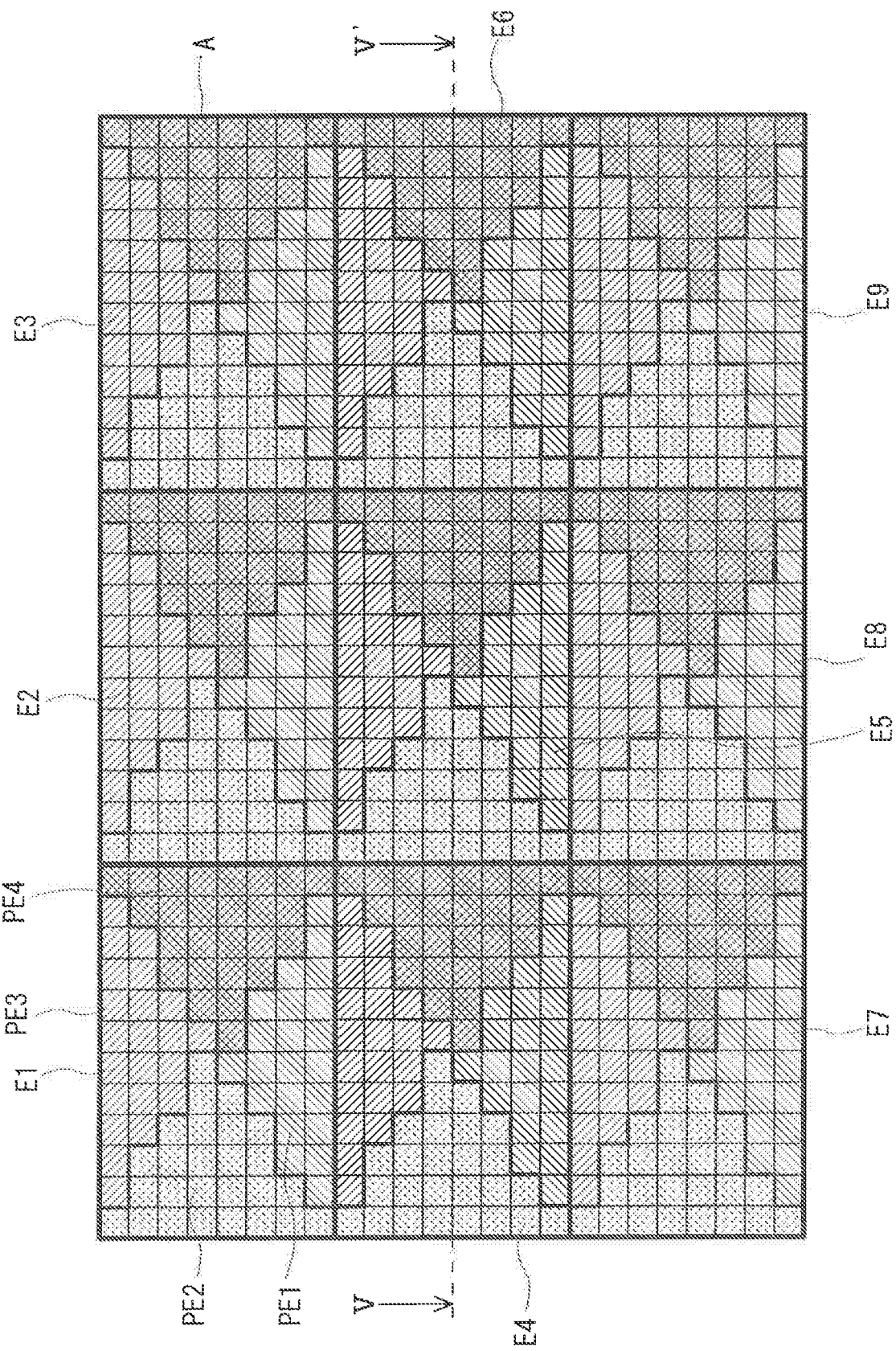
FIG. 7 is a diagram for describing an element image E according to an embodiment of the disclosure.

FIG. 7 is a diagram for describing an element image E according to an embodiment of the disclosure.

Referring to FIG. 7, a region surrounded by the lattice-shaped thick line A is an element image E corresponding to one micro-lens 21 through which the ray is transmitted by the active shutter 30. That is, the region surrounded by the lattice-shaped thick line A shown in FIG. 7 corresponds to the region surrounded by the lattice-shaped thick line A shown in FIG. 6. FIG. 7 shows total 9 element images (three element images in a transverse direction by three element images in a longitudinal direction), that is, element images E1 to E9. When any one of the plurality of element images E1 to E9 is not specified, it may be referred to as the element image E.

The element image E according to the embodiment of the disclosure includes pixels of 96 viewpoints (12 pixels by 8 pixels) which are selected respectively from the images of the multi-viewpoint image group with 96 viewpoints.

Also, the display portion 10 displays the number of element images E suitable for each image standard. For example, when a video graphics array (VGA) camera captures multi-viewpoint images, the display portion 10 displays 640 element images in the transverse direction by 480 element images in the longitudinal direction. That is, one element image E and one micro-lens 21 correspond to one pixel of the camera.

In an embodiment of the disclosure, each element image E may include four partial element images PE1 to PE4. When any one of the plurality of partial element images PE1 to PE4 is not specified, it may be referred to as a partial element image PE. Each partial element image PE corresponds to the ray constituting each 3D image when 3D images are observed from four 3D image observing areas OA1 to OA4 shown in FIGS. 2 and 3. That is, the processor 40 divides the element image E into four to allow the users to observe different 3D images simultaneously from four directions. Also, same hatches are attached to the 3D image observing area OA and the partial element image PE corresponding to each other in FIGS. 2, 3, and 7. For example, the 3D image observing area OA1 and the partial element image PE1 observed when the 3D image is observed from the 3D image observing area OA1 are each hatched diagonally from an upper right position to a lower left position. The same applies to the hatches shown in FIGS. 10 and 11, and hatches shown in FIGS. 12 and 13.

Although the above configuration may not allow the user to observe the 3D image without distortion from other regions than the 3D image observing areas OA1 to OA4 of the main lobe and the side lobes, the configuration may allow the users to observe the 3D image from the four 3D image observing areas OA1 to OA4 due to the binocular parallax or the motion parallax.

Figure 8:
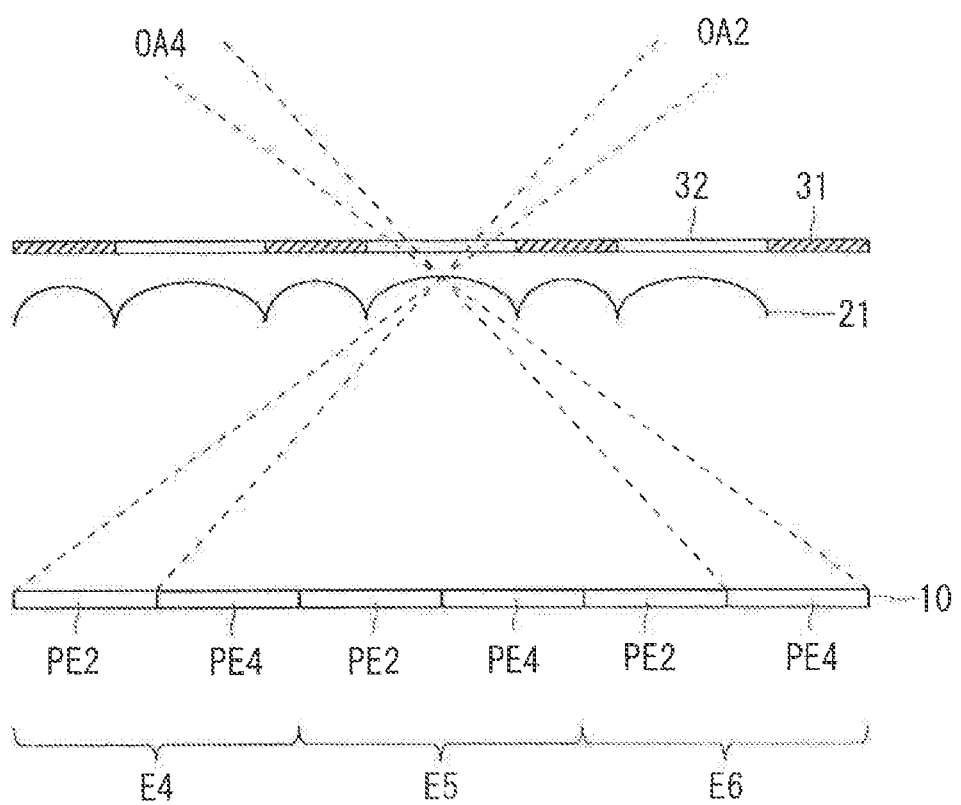
FIG. 8 is a diagram for describing a corresponding relationship between a partial element image PE and a 3D image observing area OA according to an embodiment of the disclosure.

FIG. 8 is a diagram for describing a corresponding relationship between a partial element image PE and a 3D image observing area OA according to an embodiment of the disclosure.

Referring to FIG. 8, a cross-sectional view of the display portion 10 taken along line V-V' of FIG. 7 is illustrated, when the element images E1 to E9 shown in FIG. 7 are displayed on the display portion 10.

The ray from the partial element image PE2 of the element image E4 is observed as a 3D image by a user at the 3D image observing area OA2 through the micro-lens 21 corresponding to the neighboring element image E5. Also, the ray from the partial element image PE4 of the element image E6 is observed by a user at the 3D image observing area OA4 through the micro-lens 21 of the neighboring element image E5. The user may overlook the 3D image at a position, for example, slightly higher than 45° of inclination.

When the exit pupil array 20 has the honeycomb structure as shown in FIG. 5, an effective element image has an element image width in a transverse direction (in other words, a horizontal direction) less than an element image width in a longitudinal direction (in other words, a vertical direction). However, referring to FIG. 6, regions blocking the ray are arranged at left and right sides, the element image width in the transverse direction may be doubled while maintaining the element image width in the longitudinal direction, and thus, the width in the transverse direction may be greater than the width in the longitudinal direction. In this case, as discrete arrangement of the element images, positions across both of the element image in the transverse direction and the element image in the longitudinal direction (that is, four corners of the element image) may be preferentially allocated to the longitudinal direction as shown in FIG. 7, that is, partial element images PE2 and PE4.

In addition, as described above, the processor 40 synchronizes the time-divisional transmission or block of the ray by the active shutter 30, the region of displaying the element image or the partial element image on the display portion 10, and a change in the displayed content with one another.

According to the 3D image display apparatus and the 3D image display method of the embodiment of the disclosure, the viewing zone of the 3D image may be expanded and the user may comfortably observe the 3D image.

The 3D image display apparatus or the 3D image display method according to the embodiment of the disclosure may be variously changed or modified. For example, the active shutter 30 transmits or blocks the ray from the micro-lens 21 every column in the above embodiment of the disclosure, but the active shutter 30 may transmit or block the ray at every row interval or for every column and row interval.

Figure 9:
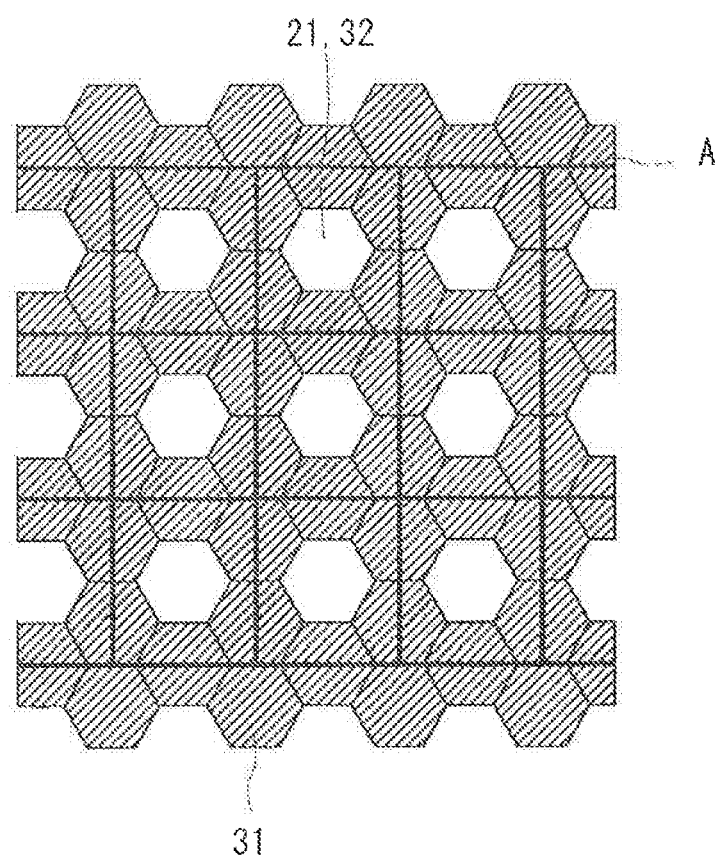
FIG. 9 is a diagram for describing an active shutter according to an embodiment of the disclosure.

FIG. 9 is a diagram for describing the active shutter 30 according to an embodiment of the disclosure.

Referring to FIG. 9, it may be understood as a drawing in which the active shutter 30 is seen from above, wherein the active shutter 30 is above the exit pupil array 20. The hatched region 31 denotes a region where the active shutter 30 blocks the ray and the non-hatched region 32 denotes a region where the active shutter 30 transmits the ray.

Referring to FIG. 9, the active shutter 30 transmits or blocks the ray from the micro-lens 21 at an interval of every column and every row. In other words, the active shutter 30 transmits the ray from one micro-lens 21 among the four micro-lenses 21 and blocks the rays from the other three micro-lenses 21. Also, the active shutter 30 sequentially transmits the rays from the four micro-lenses 21 by changing the micro-lens 21 transmitting the ray sequentially.

Here, the processor 40 arranges an element image corresponding to one micro-lens 21 transmitting the ray on a region of the display portion 10, the region including a region corresponding to the one micro-lens 21 and a region corresponding to the micro-lenses 21 blocking the ray and neighboring with the one micro-lens 21.

Figure 10:
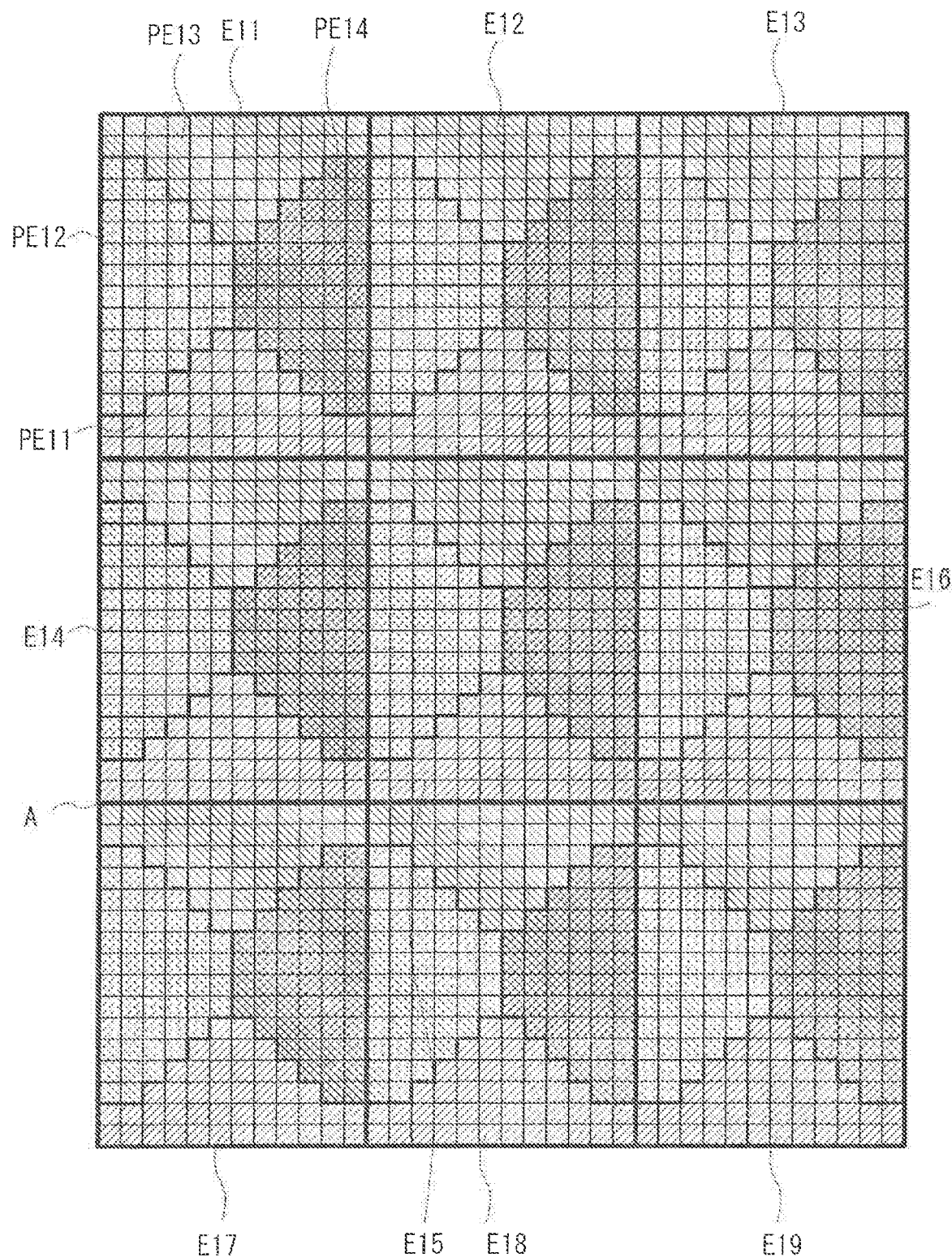
FIG. 10 is a diagram for describing an element image E according to an embodiment of the disclosure.

FIG. 10 is a diagram for describing an element image E according to an embodiment of the disclosure. Regions surrounded by the lattice-shaped thick line A are each an element image E corresponding to one micro-lens 21 through which the ray is transmitted by the active shutter 30.

Referring to FIG. 10, it shows total nine element images E11 to E19 (three images in the transverse by three images in the longitudinal direction). Each of the element images E11 to E19 consists of partial element images PE11 to PE14.

Figure 11:
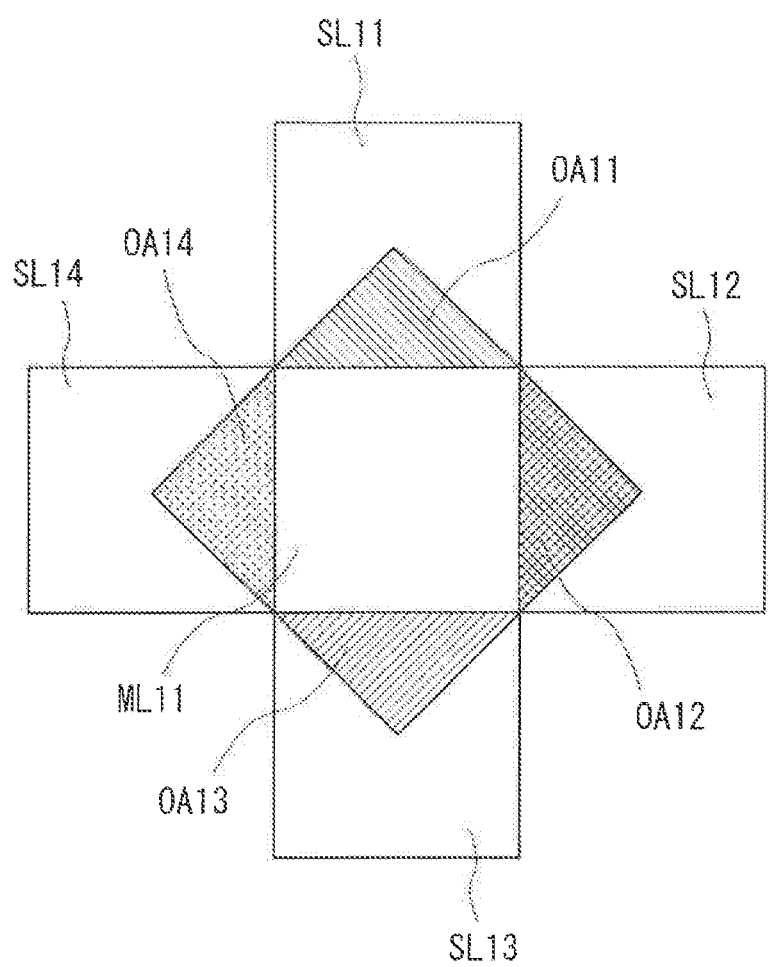
FIG. 11 is a diagram for describing a viewing zone according to an embodiment of the disclosure.

FIG. 11 is a diagram for describing a viewing zone according to an embodiment of the disclosure.

Referring to FIG. 11, it may be understood as a drawing when the viewing zone is seen from above. Four side lobes SL11 to SL14 are formed around a main lobe ML11, and four 3D image observing areas OA11 to OA14 are formed on the side lobes SL11 to SL14.

Referring to FIGS. 10 and 11, in the embodiment of the disclosure, a user may observe the partial element image PE14 of the element image E14 displayed on the display portion 10 from the 3D image observing area OA12. Also, the user may observe the partial element image PE12 of the element image E16 displayed on the display portion 10 from the 3D image observing area OA14. According to the 3D image display apparatus and the 3D image display method according to the embodiment of the disclosure, the viewing zone of the 3D image may be expanded and the user may comfortably observe the 3D image.

In the above-described embodiments of the disclosure, the partial element images have triangular shapes, but may have rectangular shapes.

Also, the processor 40 may arrange the partial element image according to an aspect ratio of the display area of the display portion 10.

Figure 12:
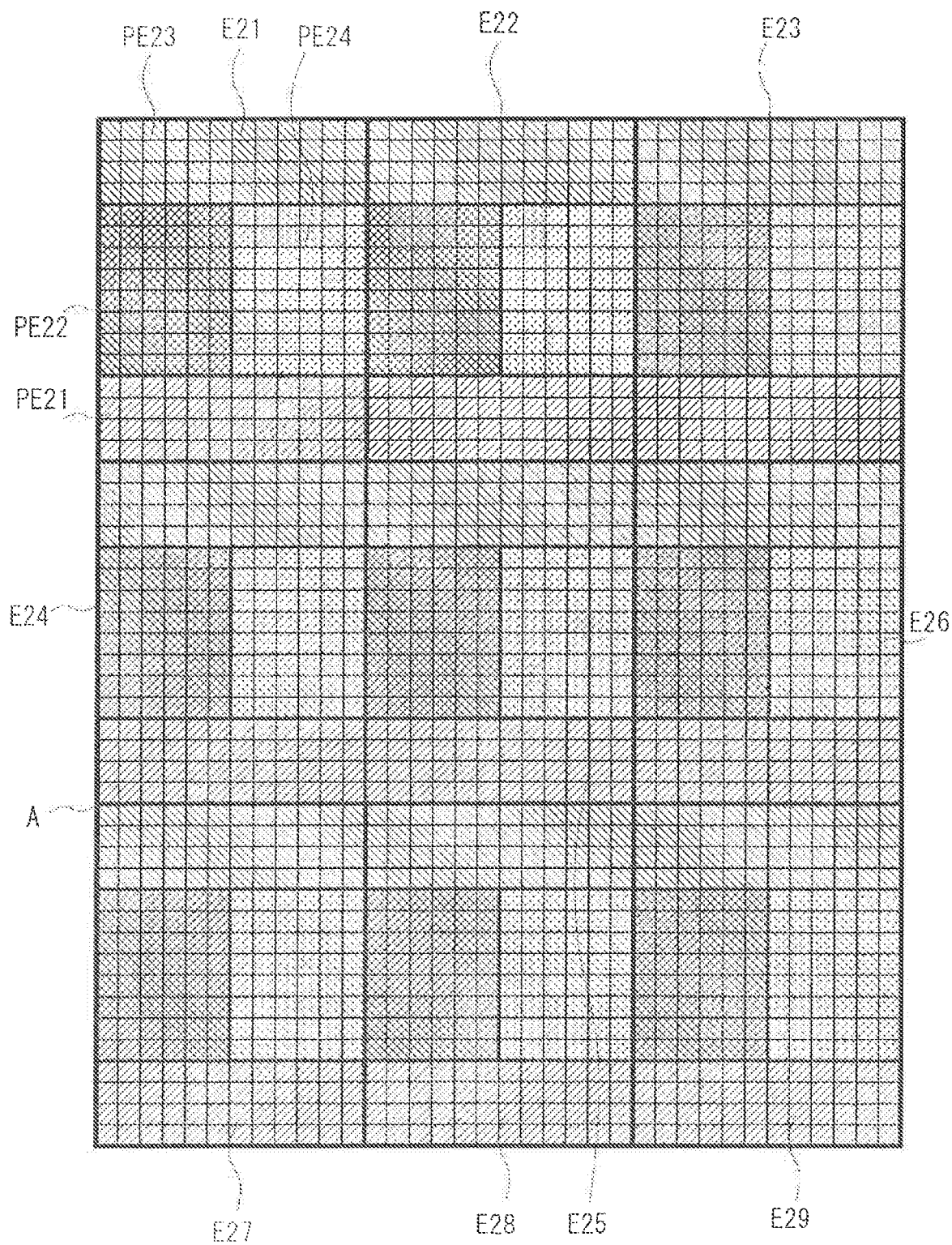
FIG. 12 is a diagram for describing an element image E according to an embodiment of the disclosure.

FIG. 12 is a diagram for describing the element image E according to an embodiment of the disclosure.

Referring to FIG. 12, regions surrounded by the lattice-shaped thick line A are each an element image E corresponding to one micro-lens 21 through which the ray is transmitted by the active shutter 30. Referring to FIG. 9, the active shutter 30 transmits or blocks the ray from the micro-lens 21 at an interval of every column and every row. FIG. 12 shows total nine element images E21 to E29 (three element images in the transverse direction by three element images in the longitudinal direction). Also, each of the element images E21 to E29 includes partial element images PE21 to PE24.

Figure 13:
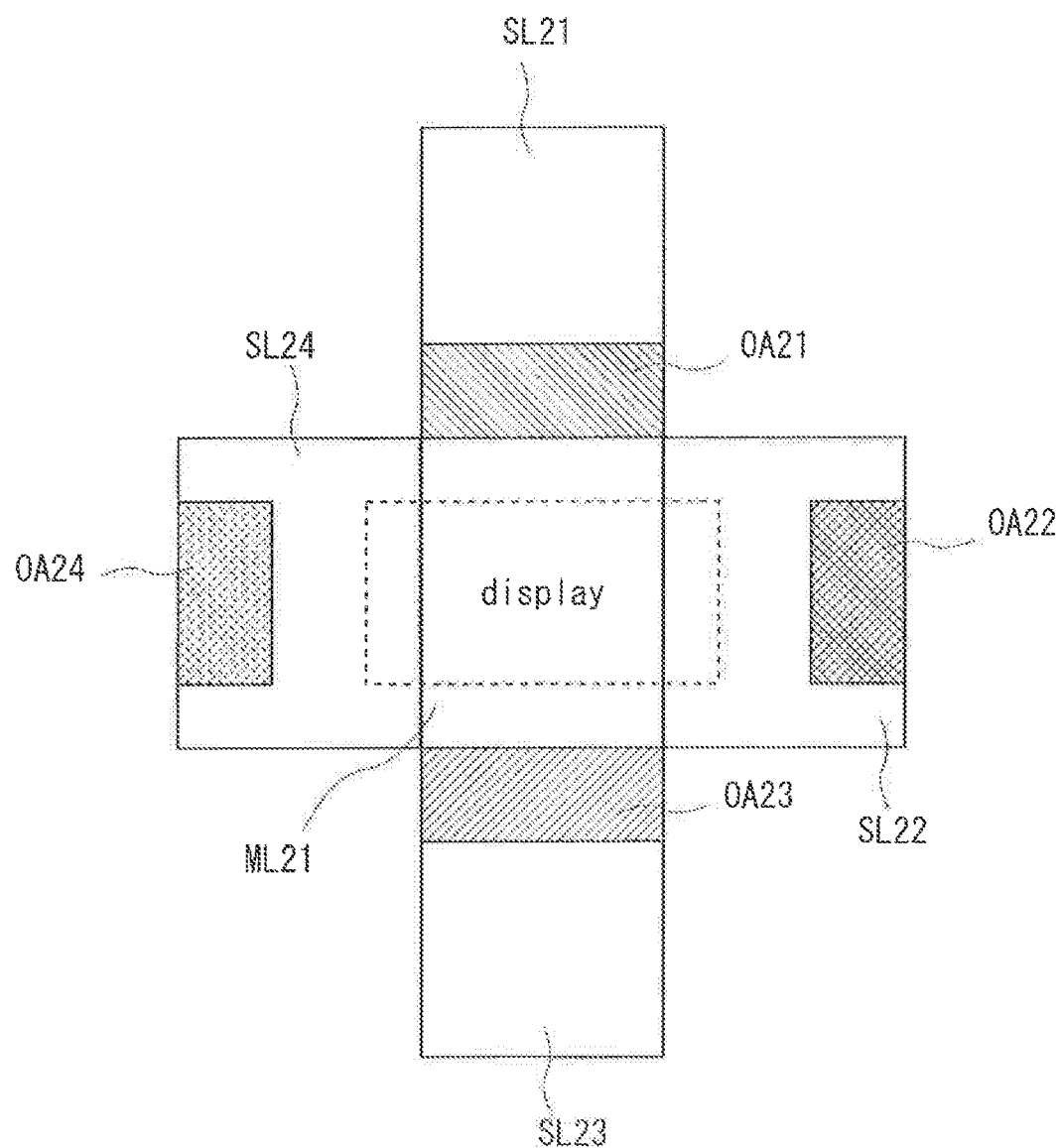
FIG. 13 is a diagram for describing a viewing zone according to an embodiment of the disclosure.

FIG. 13 is a diagram for describing a viewing zone according to an embodiment of the disclosure.

Referring to FIG. 13, it may be understood as a drawing when the viewing zone is seen from above. Four side lobes SL21 to SL24 are formed around a main lobe ML21, and four 3D image observing areas OA21 to OA24 are formed on the side lobes SL21 to SL24.

Referring to FIGS. 12 and 13, a user observes the partial element image PE22 of the element image E24 displayed on the display portion 10 from the 3D image observing area OA22. Also, the user observes the partial element image PE24 of the element image E26 displayed on the display portion 10 from the 3D image observing area OA24. According to the 3D image display apparatus and the 3D image display method according to the embodiment of the disclosure, the viewing zone of the 3D image may be expanded and the user may comfortably observe the 3D image.

In the embodiment of the disclosure, the display area of the display portion 10 has a rectangular shape. Although the user observes the 3D images from the 3D image observing areas in four directions, that is, substantially perpendicular to sides of the display area, the user may observe the 3D image from 3D image observing area(s) in one to three directions, which are provided in directions substantially perpendicular to the sides of the display area. In this case, the processor 40 arranges an element image or a plurality of partial element images so that a 3D image without distortion may be observed from each 3D image observing area.

In the embodiment of the disclosure, the display area of the display portion 10 has a rectangular shape, but the display area may have a polygonal shape, a rectangular shape, or a circular shape, and in this case, the processor 40 arranges the element image or the plurality of partial element images so that the 3D image without distortion may be observed from each 3D image observing area.

In the above embodiment of the disclosure, the processor 40 arranges an element image or a partial element image of an overlooked 3D image under the micro-lens 21 that is next to (or around) the micro-lens 21 transmitting the ray from the element image or the partial element image, but the processor 40 may further arrange the element image or the partial element image of the overlooked 3D image under the micro-lens 21 transmitting the ray from the element image or the partial element image. For example, in the above embodiment of the disclosure, the 3D image by the ray from the partial element image PE2 of the element image E4 is observed from the 3D image observing area OA2 shown in FIG. 8, but the 3D images by the rays from the partial element images PE2 and PE4 of the element image E4 and the partial element image PE2 of the element image E5 may be observed.

In the above embodiment of the disclosure, the operation of arranging the element image is implemented by the processor 40 of the 3D image display apparatus 1, but at least some of the operations of arranging the element image may be implemented by another device separately provided from the 3D image display apparatus 1. For example, the 3D image display apparatus 1 may receive the element images shown in FIGS. 7, 10, and 12 from an external element image arranging apparatus of the 3D image display apparatus 1.

The 3D image display apparatus 1 according to the embodiment of the disclosure may be implemented as a 3D image generating and displaying system including the 3D image display apparatus 1 and a plurality of imaging apparatuses capturing the multi-viewpoint image group, e.g., TV conference system, etc.

Also, the 3D image display apparatus 1 according to the above embodiments of the disclosure or the 3D image generating and displaying system may be implemented as a game console, as an interior item, etc.

The 3D image display apparatus 1 according to the embodiments of the disclosure includes the display portion 10 displaying a plurality of element images E, the exit pupil array 20 including a plurality of exit pupils (micro-lenses 21) two-dimensionally arranged on the display portion 10 and controlling an exit direction of the ray from the element image E, the active shutter 30 arranged above or under the exit pupil array 20 for transmitting or blocking the ray through each of the exit pupils (e.g., micro-lenses 21), and the processor 40 for generating a plurality of element images E from the multi-viewpoint image group and arranging the element images E to correspond to the exit pupils (e.g., micro-lenses 21), and for synchronizing the display of the element images E on the display portion 10 with the transmission or block of the ray by the active shutter 30. The processor 40 arranges the element images E on the region including the region corresponding to the exit pupil (e.g., micro-lens 21) through which the ray is transmitted by the active shutter 30 and the region corresponding to the exit pupils (e.g., micro-lenses 21) that blocks the ray by the active shutter 30.

Next, the 3D image display apparatus 1 and the 3D image display method according to another embodiment of the disclosure will be described below. According to the embodiment of the disclosure, recognition of a moire by a user is prevented when the user watches a 3D image.

Figure 14A:
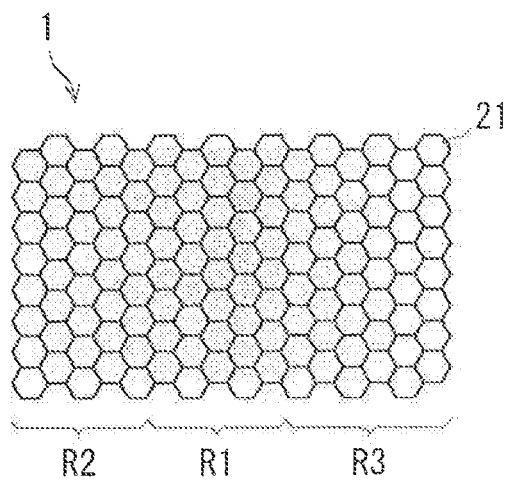
FIGS. 14A and 14B are diagrams for describing a concept of restraining visual recognition of moire in a 3D image display apparatus according to an embodiment of the disclosure.
Figure 14B:
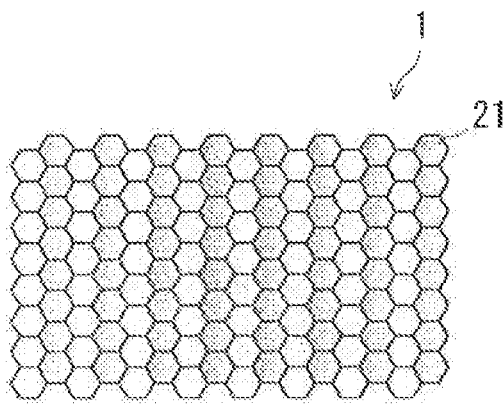

FIGS. 14A and 14B are diagrams for describing a concept of restraining visual recognition of the moire in the 3D image display apparatus 1 according to an embodiment of the disclosure.

Referring to FIGS. 14A and 14B, when the 3D image is observed through the micro-lens 21 in the 3D image display apparatus 1, moire that interferes with the observation may be generated according to an observing position as shown in of FIG. 14A. A moire (3D moire) is a periodical spot of luminance. In FIG. 14A, an intermediate region R1 is dark and opposite regions R2 and R3 becomes brighter in the 3D image display apparatus 1. The above moire is a spot of a very large cycle and is easy to recognize.

In addition, the 3D image display apparatus 1 according to the embodiment of the disclosure is configured to disperse the spot of the large cycle into fine cycles as shown in FIG. 14B. As such, the user is restrained to visually recognize moire when looking at the 3D image. This will be described in detail later.

Figure 15:
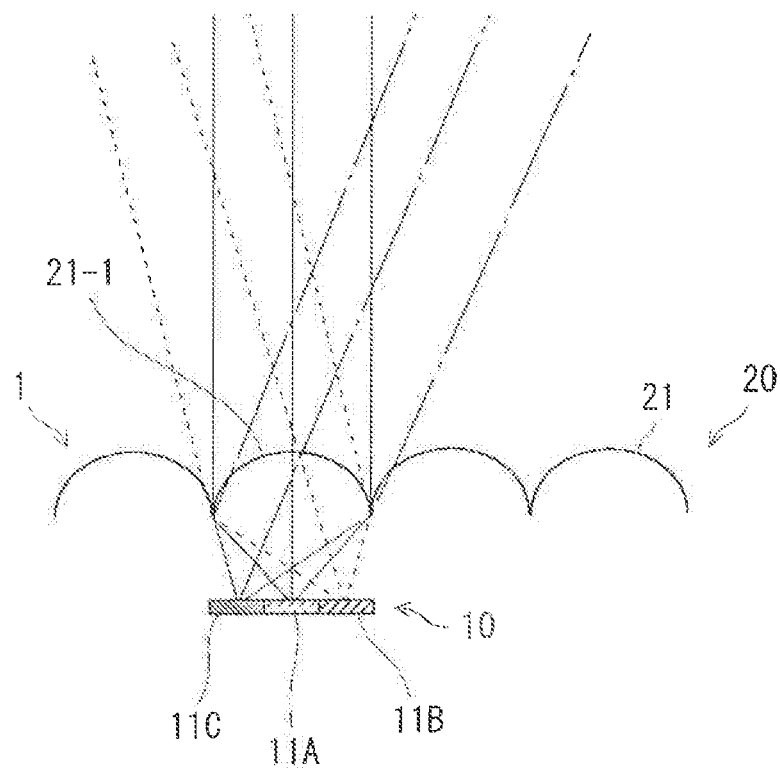
FIG. 15 is a diagram for describing a principle of displaying a 3D image in a 3D image display apparatus according to an embodiment of the disclosure.

FIG. 15 is a diagram for describing a principle of displaying a 3D image in a 3D image display apparatus according to an embodiment of the disclosure.

Figure 16:
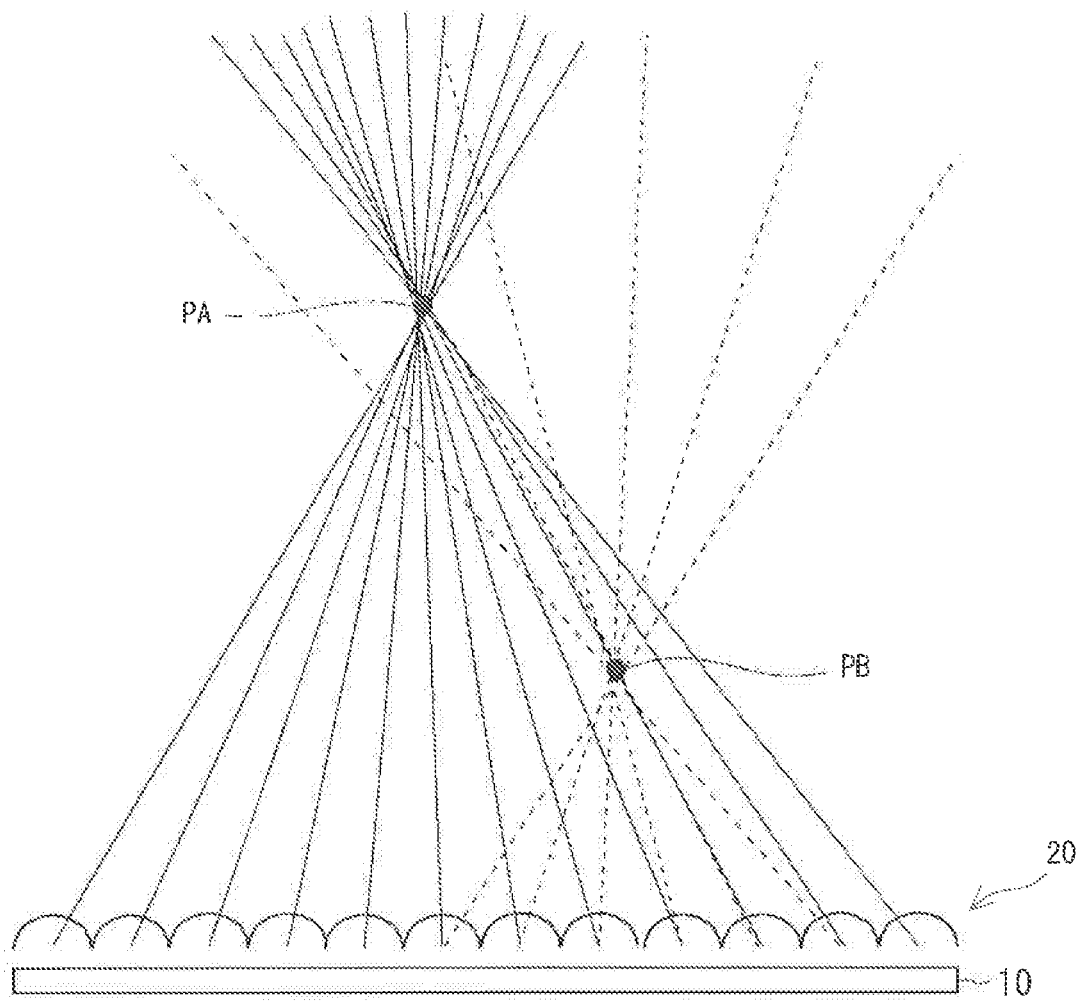
FIG. 16 is a diagram for describing a principle of displaying a 3D image in a 3D image display apparatus according to an embodiment of the disclosure.

FIG. 16 is a diagram for describing a principle of displaying a 3D image in a 3D image display apparatus according to an embodiment of the disclosure.

Figure 17:
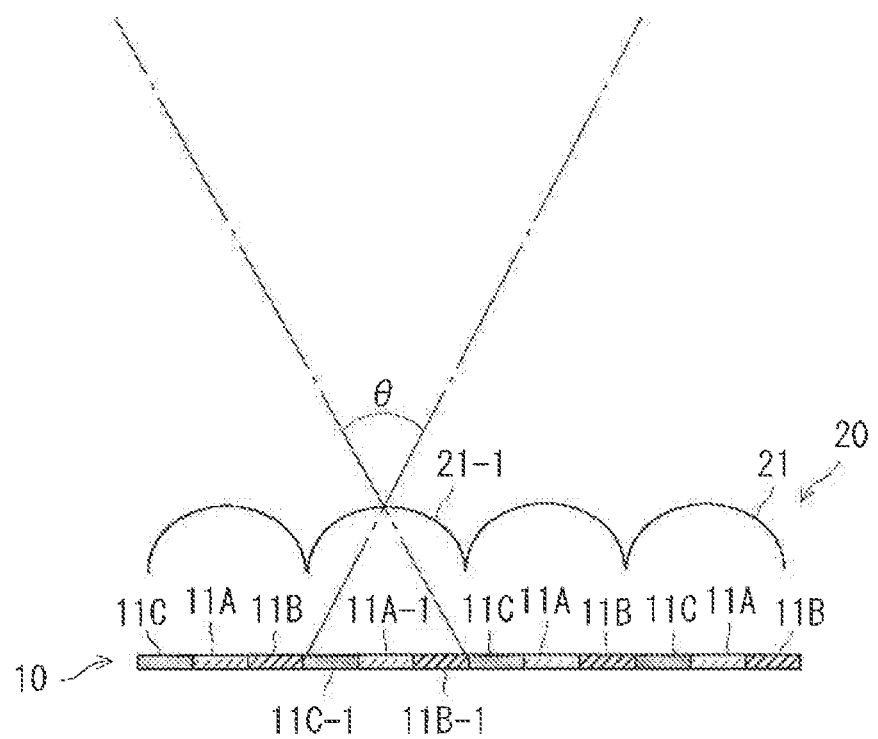
FIG. 17 is a diagram for describing a principle of displaying a 3D image in a 3D image display apparatus according to an embodiment of the disclosure.

FIG. 17 is a diagram for describing a principle of displaying a 3D image in a 3D image display apparatus according to an embodiment of the disclosure.

Figure 18:
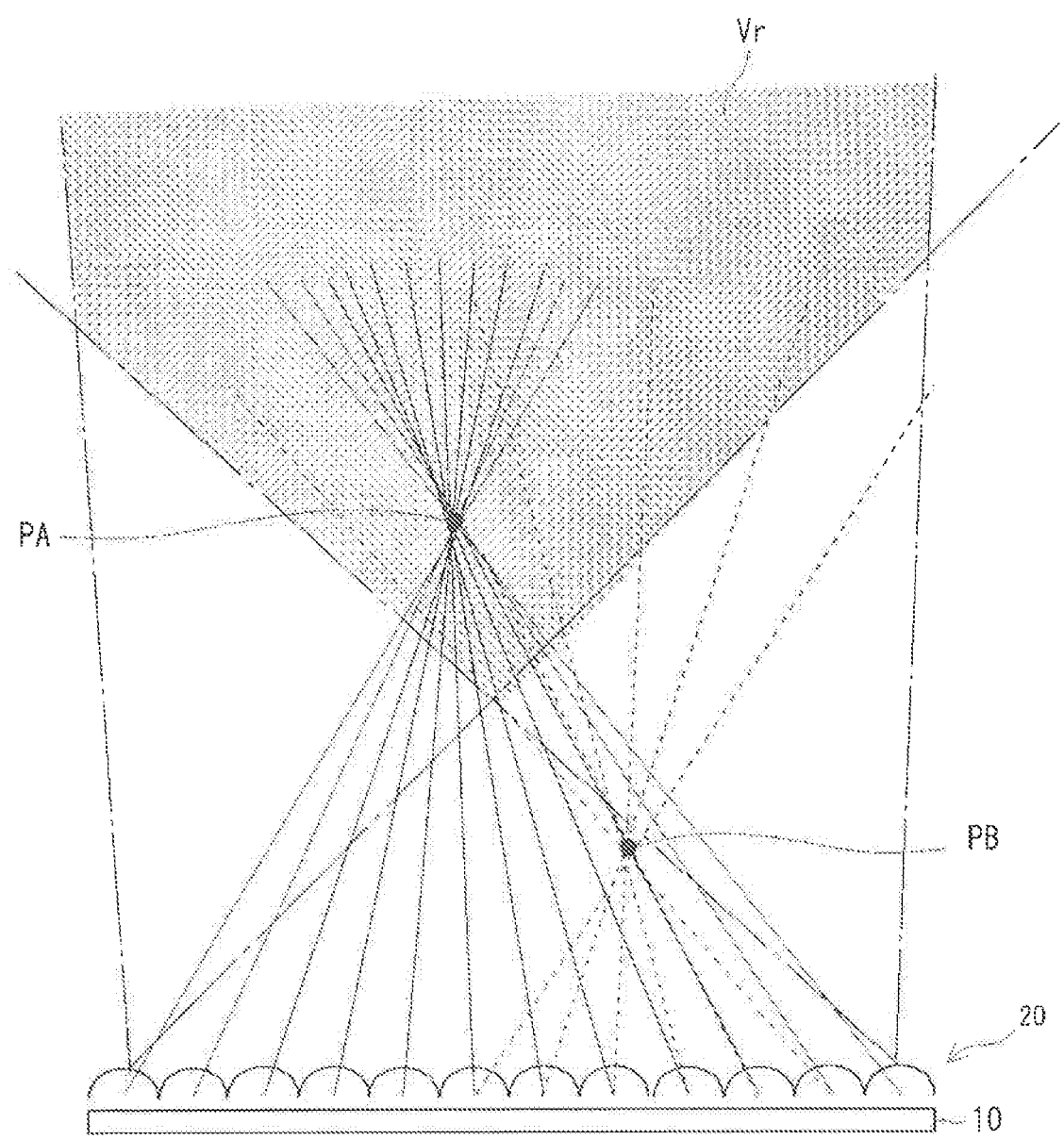
FIG. 18 is a diagram for describing a principle of displaying a 3D image in a 3D image display apparatus according to an embodiment of the disclosure.

FIG. 18 is a diagram for describing a principle of displaying a 3D image in a 3D image display apparatus according to an embodiment of the disclosure. Also, principles described with reference to FIGS. 15, 16, 17, and 18 may be also applied to the embodiments of the disclosure described above with reference to FIGS. 1, 2, 3, 4, 5, 6, 7, 8, 9, 10, 11, 12, and 13. Also, FIGS. 15, 16, 17, and 18 show a general example in which the viewing zone is not expanded by the active shutter 30.

Referring to FIG. 15, the 3D image display apparatus 1 includes the exit pupil array 20 (micro-lens array) including a plurality of micro-lenses 21 (exit pupils), and the display portion 10 having a plurality of pixels 11A to 11C. Referring to FIG. 15, the micro-lenses 21 are arranged above the pixels 11 to make the light from the pixels 11 have directivity. For example, when a distance between the pixel 11 and a principal point of the micro-lens 21 is a focal distance of the micro-lens 21, the light from the pixel 11 is emitted through the micro-lens 21 as parallel light.

In the example of FIG. 15, the light from a pixel 11A at the center under a micro-lens 21-1 is emitted upward as denoted by solid lines. Also, the light from a pixel 11B at the right is emitted to the left as denoted by dotted lines, and the light from a pixel 11C at the left is emitted to the right as denoted by dashed-dot lines. As described above, the light from the pixels 11 under the micro-lens 21 may be respectively represented light in a certain direction. Here, reference numeral 21-1 is used to refer to a specific micro-lens in the drawings, and reference numerals 11A, 11B, and 11C are used to refer to specific pixels on the drawings.

Referring to FIG. 15, because the light from the pixel 11 has directivity, one point having depth may be expressed by a set of rays from each pixel 11 as shown in FIG. 16. For example, a point PA is a point where the light from the pixels 11A under respective micro-lenses 21 is collected. A point PB is a point where the light from the pixels 11B under respective micro-lenses 21 is collected. Also, the pixels 11A under the respective micro-lenses 21 correspond to the same position of a photographed object, and the position is reproduced by the point PA. Likewise, the pixels 11B under the respective micro-lenses 21 correspond to the same position of the photographed object, and the position is reproduced by the point PB. As described above, the 3D image display apparatus 1 according to the embodiment of disclosure expresses a point having a three-dimensional depth as the light condensed at one point in a space.

Here, the number of pixels 11 under each micro-lens 21 is finite. In the example referring to FIG. 17, it is assumed that there are three pixels 11 represented as 11A, 11B, and 11C under each of the micro-lens 21. For example, there are three pixels 11, that is, pixels 11A-1, 11B-1, and 11C-1, under a micro-lens 21-1. For the micro-lens 21 next to the micro-lens 21-1, the light is expressed by the pixels 11 under the micro-lens 21. Therefore, in one micro-lens 21-1, the light ray is expressed within a range of an element image right under the micro-lens 21-1. That is, a range of the point that may be expressed by the micro-lens 21-1 is an angle range (viewing angle θ) that is determined by a main point of the micro-lens 21-1 and a width of the element image. Outside the viewing angle θ, the light due to the element image under the micro-lens 21 that is next to the micro-lens 21-1 is expressed, and thus an intended 3D image may not be represented.

Therefore, an overlapping range of the display ranges represented through the micro-lenses 21 in the element image is an observable range (viewing zone). Referring to FIG. 18, a hatched region Vr represents a viewing zone corresponding to the overlapping display area from an end of a screen to the other end of the screen of the display portion 10.

Next, the cases in which the exit pupil array 20 (exit pupil) is implemented as a micro-lens array and a pin-hole array will be described below with reference to accompanying drawings.

FIG. 19 is a diagram showing an example in which the exit pupil array 20 is executed as a pin-hole array according to an embodiment of the disclosure.

Figure 20:
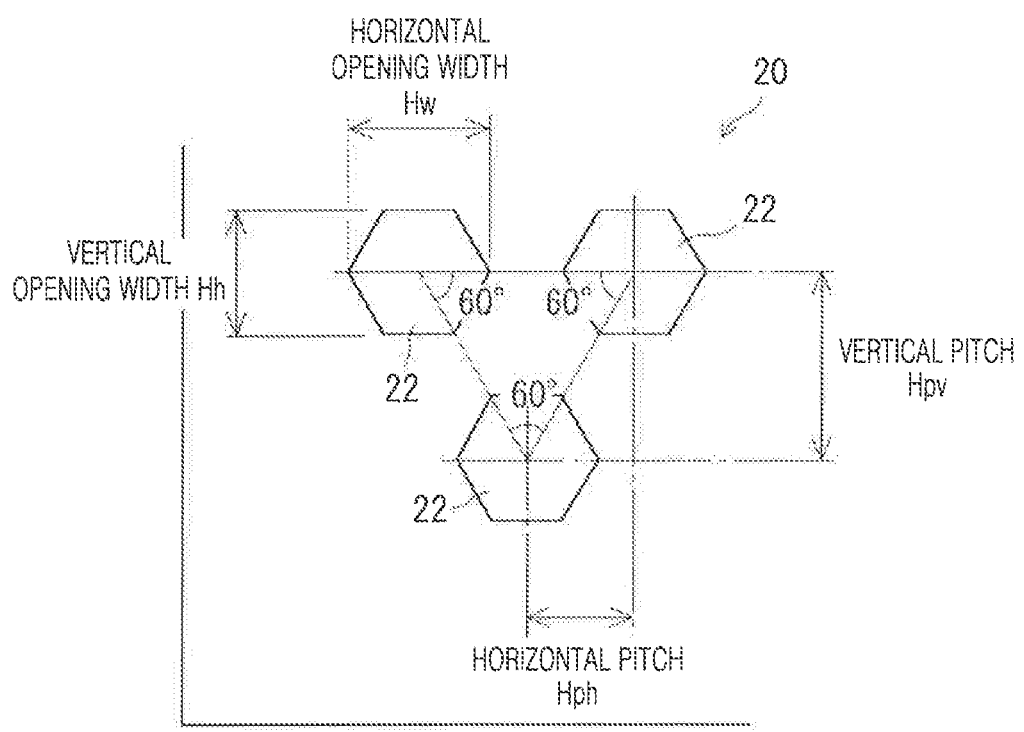
FIG. 20 is an enlarged view of the pin-hole array of FIG. 19 according to an embodiment of the disclosure.

FIG. 20 is an expanded view of the pin-hole array of FIG. 19 according to an embodiment of the disclosure. The exit pupil array 20 including the pin-hole array covers the display portion 10, and thus, an area of the pin-hole array is substantially equal to that of the display portion 10.

Referring to FIG. 19, the exit pupil array 20 including the pin-hole array includes a plurality of pin holes 22. Referring to FIGS. 19 and 20, each of the pin hole 22 may have, for example, a regular hexagonal shape.

Referring to FIG. 20, the pin hole 22 may be arranged at an angle of 60° with neighboring pin holes 22. A length of the pin hole 22 in a horizontal direction (transverse direction) is represented as a horizontal opening width Hw. A length of the pin hole 22 in a vertical direction (longitudinal direction) is represented as a vertical opening width Hh. A distance (center distance) between neighboring pin holes 22 in the horizontal direction (transverse direction) is represented as a horizontal pitch Hph. A distance (center distance) between neighboring pin holes 22 in the vertical direction (longitudinal direction) is represented as a vertical pitch Hpv.

Here, the number of pin holes 22 in the horizontal direction (the number of horizontal transmissive openings) correspond to the number of horizontal pixels (the number of horizontal 3D pixels) when the 3D image is seen. Likewise, the number of pin holes 22 in the vertical direction (the number of vertical transmissive openings) corresponds to the number of vertical pixels (the number of longitudinal 3D pixels) when the 3D image is seen. Each pitch is determined according to a width of the element image in each direction and an angle of the viewing zone (viewing angle). The opening width is a size through which one light ray of the displayed pixel is transmitted. That is, the opening width is a size of an RGB triplet (one set of RGB sub-pixels) including the sub-pixels. Accordingly, because a color distribution is restrained from collapsing, it is difficult for the user to feel a moire of parallax. Here, the RGB triplet may be understood as a set of sub-pixels so that each of the pixels in the display portion represents color.

Figure 21:
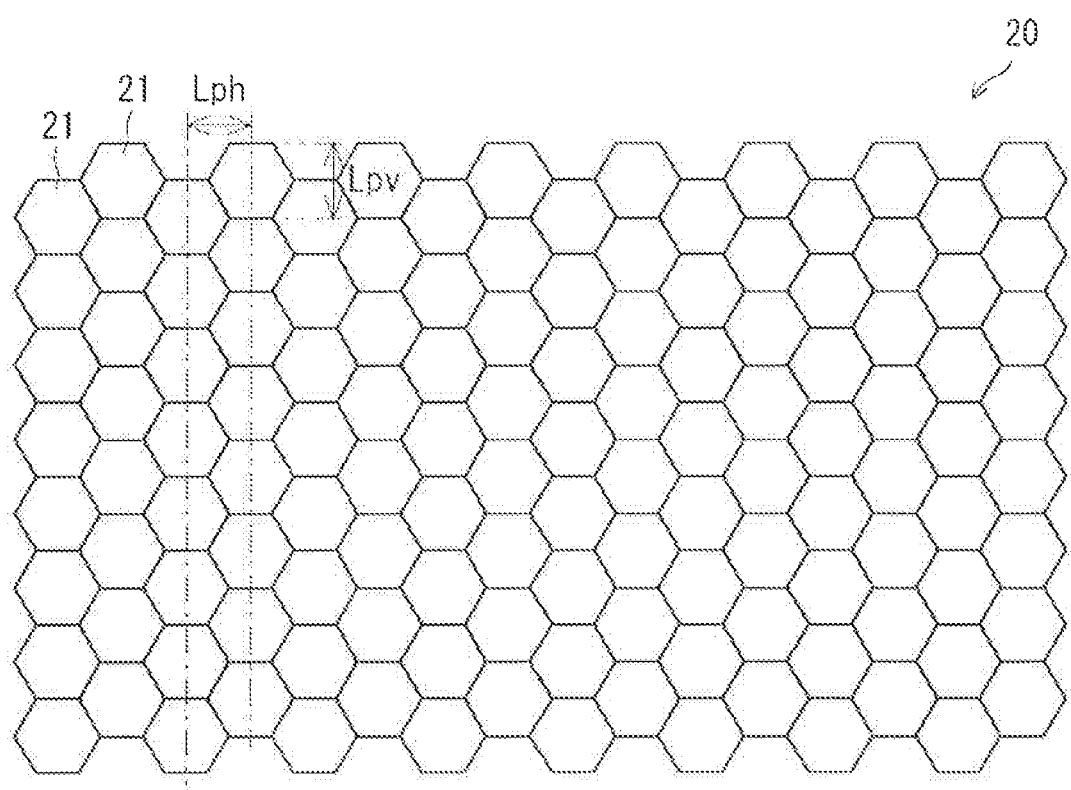
FIG. 21 is a diagram showing an example in which an exit pupil array is executed as a micro-lens array according to an embodiment of the disclosure.

FIG. 21 is a diagram showing an example in which the exit pupil array 20 is executed as a micro-lens array according to an embodiment of the disclosure. The exit pupil array 20 including the micro-lens array covers the display portion 10, and thus, an area of the micro-lens array is substantially equal to that of the display portion 10.

Like the example of FIG. 5, the exit pupil array 20 including the micro-lens array has a honeycomb structure in which the micro-lenses 21 each having a regular hexagon shape are arranged without a gap therebetween. Therefore, FIG. 21 shows opening shapes of a honeycomb lens. As such, the micro-lenses 21 having the regular hexagonal shape are alternately arranged, the arrangement may be effective and a resolution of the 3D image may be improved. Also, when the micro-lenses 21 are arranged as described above, lens efficiency may be also improved.

Referring to FIG. 21, a distance from an upper end to a lower end of the micro-lens 21 is a 3D pixel pitch Lpv in the vertical direction (longitudinal direction). Also, a center distance between neighboring micro-lenses 21 in the horizontal direction (transverse direction) is a horizontal 3D pixel pitch Lph. Here, in the micro-lens array, the number of peaks of the micro-lenses 21 corresponds to the number of 3D pixels when seeing a 3D image. In addition, like in the pin-hole array, the number of peaks of the micro-lenses 21 in the vertical direction corresponds to the number of vertical pixels (the number of longitudinal 3D pixels) when seeing the 3D image. Also, the number of peaks of the micro-lenses 21 in the horizontal direction corresponds to the number of horizontal pixels (the number of horizontal 3D pixels) when seeing the 3D image.

Figure 22:
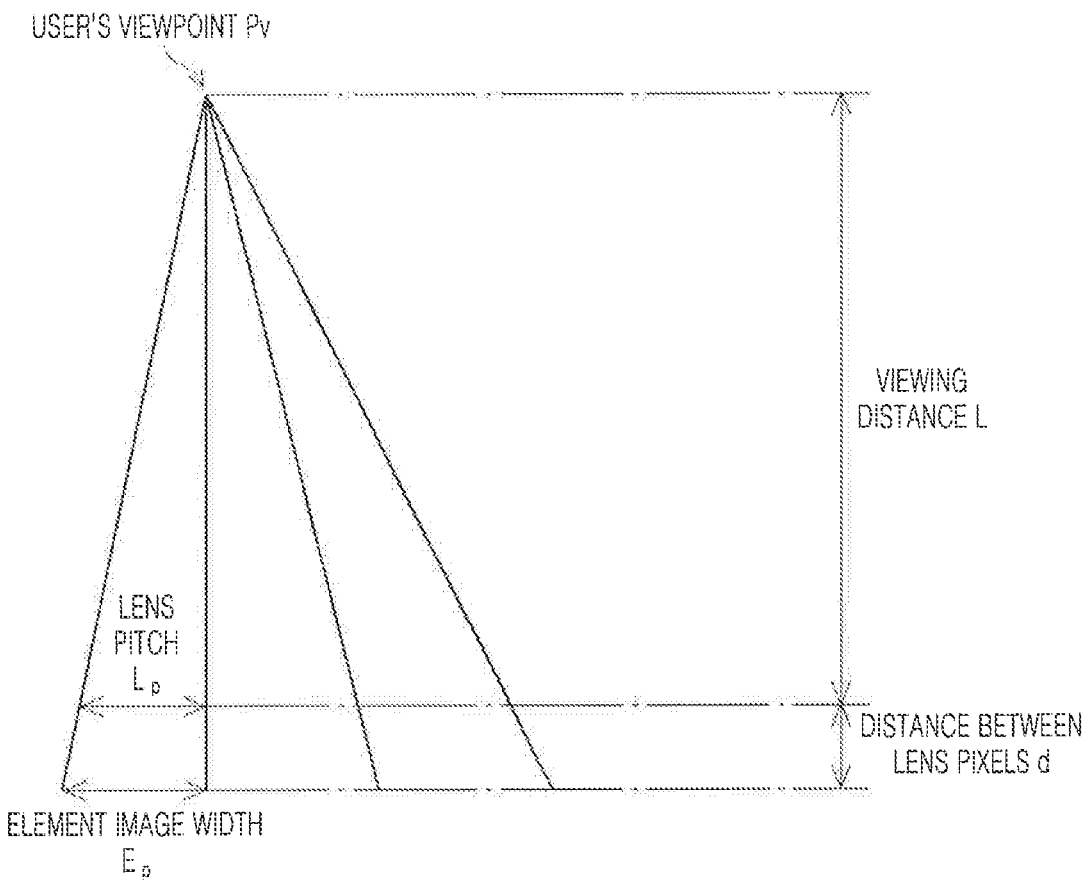
FIG. 22 is a diagram for describing conditions for designing a 3D image display apparatus according to an embodiment of the disclosure.

FIG. 22 is a diagram for describing conditions for designing a 3D image display apparatus according to an embodiment of the disclosure.

Referring to FIG. 22, it shows a case in which the exit pupil array 20 is implemented as the micro-lens array. First, a method of calculating a distance d between lens pixels will be described below. An element image width $E_p$ may be expressed as Equation 1 below by using a pixel pitch Pp (pixel width). Here, nv denotes the number of parallaxes.

$$E_p = nv \times Pp \qquad \text{Equation 1}$$

The distance d between the lens pixels may be expressed as Equation 2 below by using a viewing angle θ in FIG. 17.

$$d = \tan(\theta/2) \times E_p/2 \qquad \text{Equation 2}$$

Equation 2 above may be expressed as Equation 3 below by using Equation 1 above.

$$d = \tan(\theta/2) \times nv \times Pp/2 \qquad \text{Equation 3}$$

Next, a method of calculating a lens pitch $L_p$ will be described below. In order to optimize a viewing zone at a position of the distance (viewing distance L) from the micro-lens 21 to a user viewpoint Pv, the micro-lens 21 is designed for a circular shape with the light of the element image having the viewing distance L. Through the above design, another viewing zone may be optimized at the position of the viewing distance L.

The lens pitch $L_p$ may be calculated according to Equation 4 below in a geometrical way by using an element image pitch (element image width) Ep, the viewing distance L, and the distance d between the lens pixels, in FIG. 22.

$$L_p = E_p \times L/(L+d) \qquad \text{Equation 4}$$

In addition, in the case of overview display, a user is likely to observe the 3D image with a distance of an arm length as the viewing distance L. That is, the viewing distance L may be determined in advance according to the arm length, etc. An adult generally has an arm length of about 600 mm, and thus, the lens pitch $L_p$ may be designed with the viewing distance L of 600 mm, for example.

Figure 23:
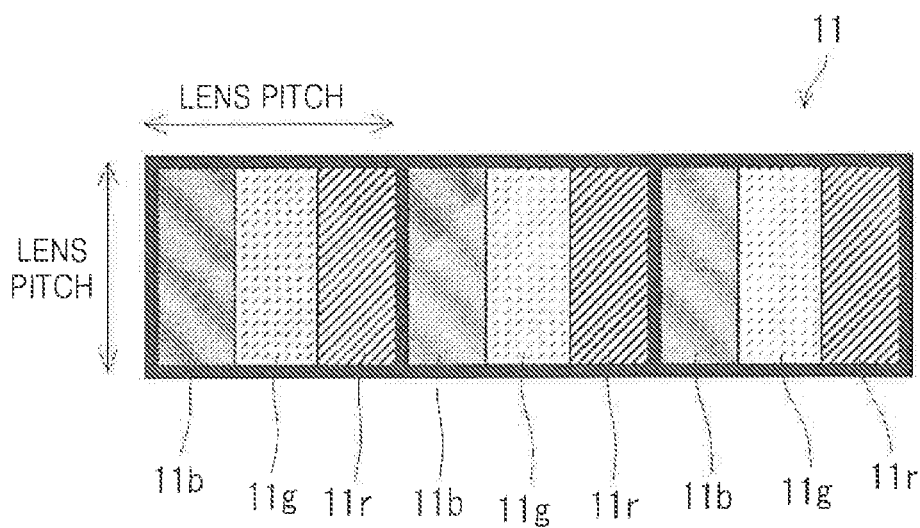
FIG. 23 is a diagram showing a relation between a lens pitch and a pixel enlarged image according to an embodiment of the disclosure.

FIG. 23 is a diagram showing a relation between a lens pitch and a pixel enlarged image, according to an embodiment of the disclosure.

Referring to FIG. 23, next, a method of calculating a radius of curvature of the micro-lens 21 will be described below. FIG. 23 is a diagram showing a relation between a lens pitch and a pixel enlarged image, according to an embodiment of the disclosure. Referring to FIG. 23, an image of the pixel 11 magnified by the micro-lens 21 is shown. The pixel 11 includes a triplet including a red sub-pixel 11r, a green sub-pixel 11g, and a blue sub-pixel 11b. Every pixel may represent color by being expressed by the RGB triplet. As such, even when observing from other position than a front portion, pixels of next parallax are sequentially observed, and thus it is difficult to observe the moire. Therefore, referring to FIG. 23, a magnification of the micro-lens 21 is obtained under the condition in which all the triplets of the pixel are observed in the micro-lens 21.

The magnification m may be calculated according to Equation 5 below with a lens pitch $L_p$ and a pixel pitch Pp.

$$m = L_p/Pp \qquad \text{Equation 5}$$

A focal distance f may be expressed by Equation 6 below, by using a distance d between the lens pixels and a position d1' of an image plane on which the pixel is magnified.

$$f = d \times d'/(d+d') = d/(1+d/d') \qquad \text{Equation 6}$$

The magnification m may be expressed by Equation 7 below.

$$m = d'/d \qquad \text{Equation 7}$$

When the equation above is substituted into an imaginary equation of Equation 6, Equation 8 below is obtained.

$$f = d/(1+1/m) = d/(1+Pp/L_p) \qquad \text{Equation 8}$$

Also, when the micro-lens 21 is a plane convex lens, the radius of curvature r may be obtained from Equation 9 below by using a refractive index n.

$$r = f \times (n-1) \qquad \text{Equation 9}$$

Here, when Equation 8 above is substituted into Equation 9 above, Equation 10 below is obtained.

$$r = d/(1+Pp/L_p) \times (n-1) \qquad \text{Equation 10}$$

The micro-lens array may be designed as described above. Also, when the exit pupil array 20 is implemented as the pin-hole array, the pin-hole array may be designed in the same manner as above. In this case, the opening width, instead of the radius of curvature, may be designed to be the size of the RGB triplet.

Next, operations of the active shutter 30 according to the embodiment of the disclosure will be described below with reference to accompanying drawings. According to the operations of the active shutter 30 in the embodiment of the disclosure, a field sequential method may be realized.

Figure 24:
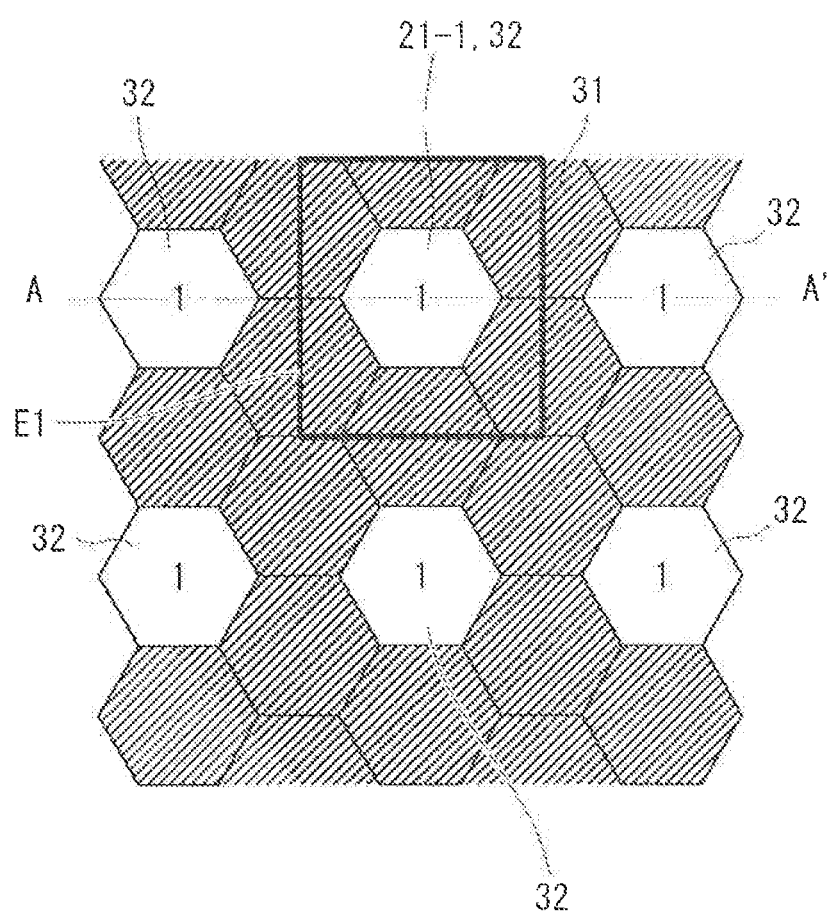
FIG. 24 is a diagram illustrating an operation of an active shutter according to an embodiment of the disclosure.

FIG. 24 is a diagram illustrating an operation of an active shutter according to an embodiment of the disclosure.

Figure 25:
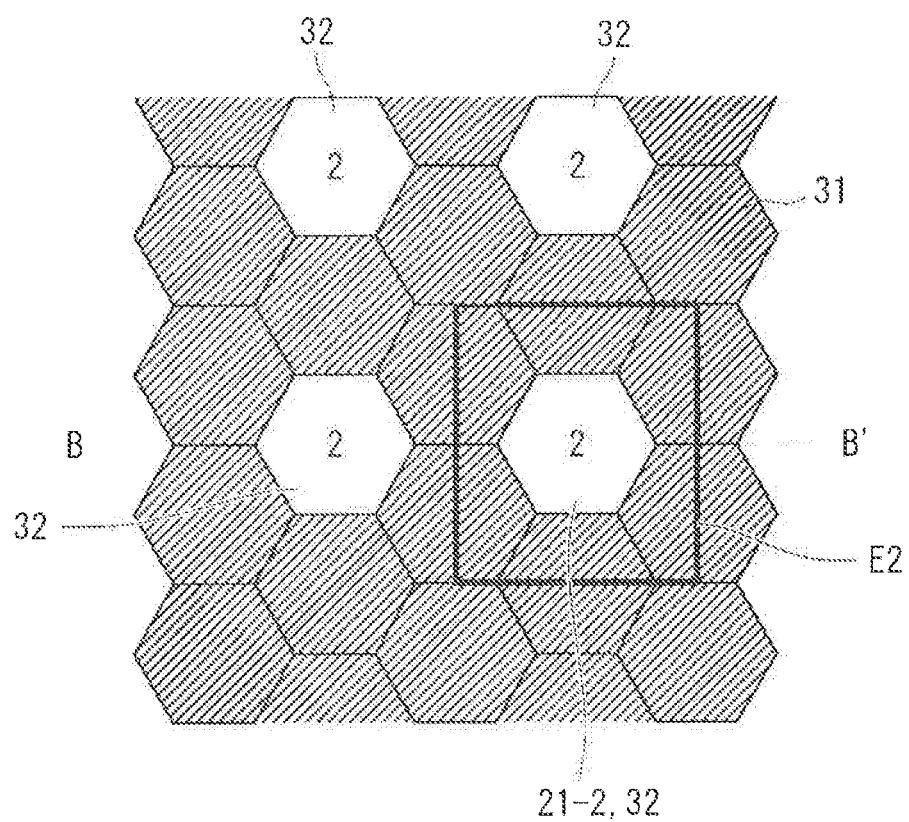
FIG. 25 is a diagram illustrating an operation of an active shutter according to an embodiment of the disclosure.

FIG. 25 is a diagram illustrating an operation of an active shutter according to an embodiment of the disclosure.

Figure 26:
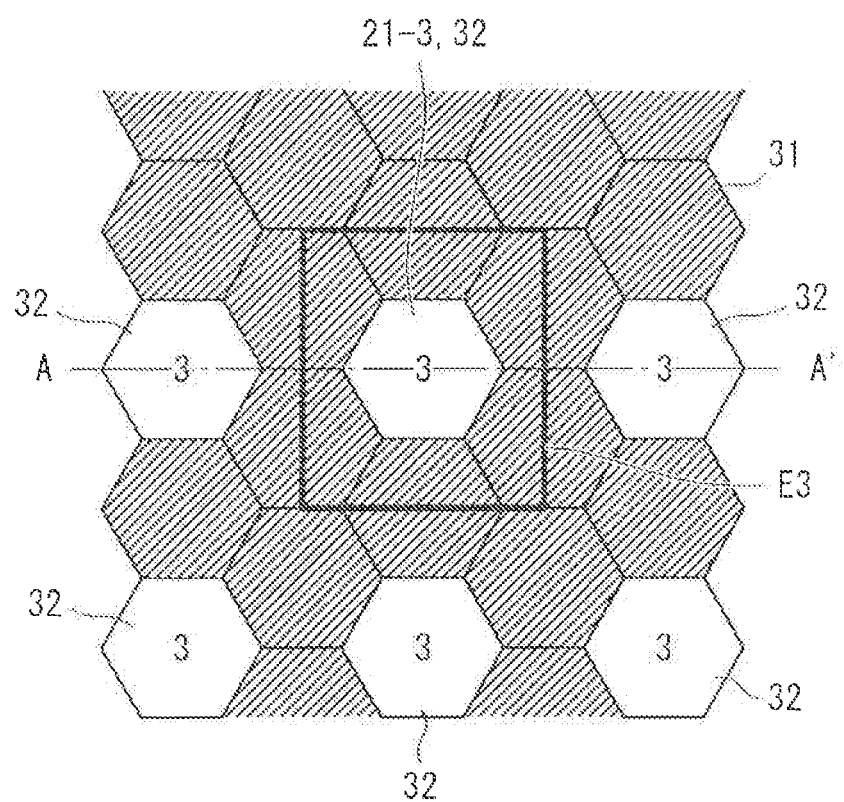
FIG. 26 is a diagram illustrating an operation of an active shutter according to an embodiment of the disclosure.

FIG. 26 is a diagram illustrating an operation of an active shutter according to an embodiment of the disclosure.

Figure 27:
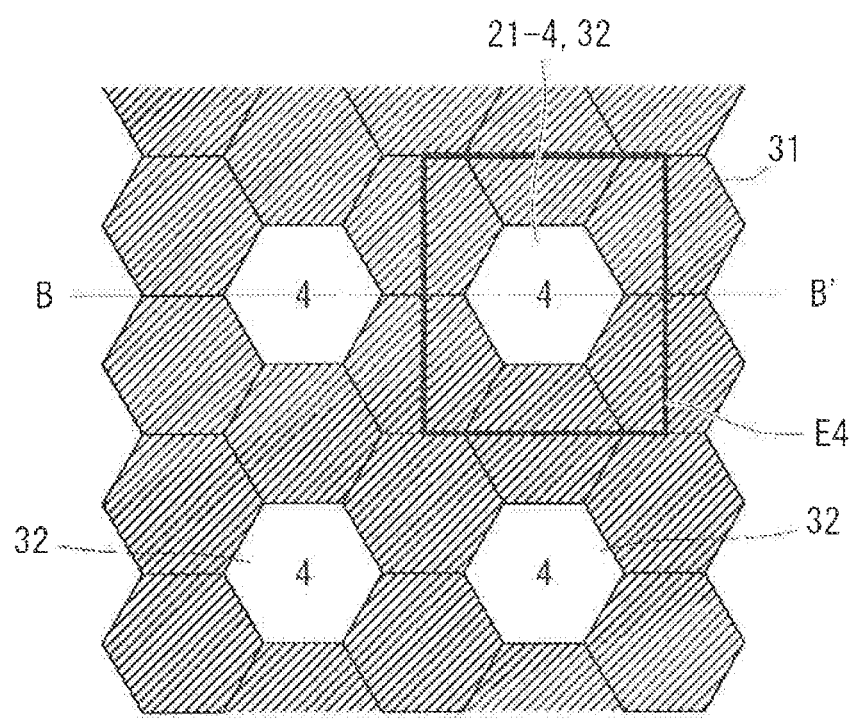
FIG. 27 is a diagram illustrating an operation of an active shutter according to an embodiment of the disclosure.

FIG. 27 is a diagram illustrating an operation of an active shutter according to an embodiment of the disclosure.

Figure 28:
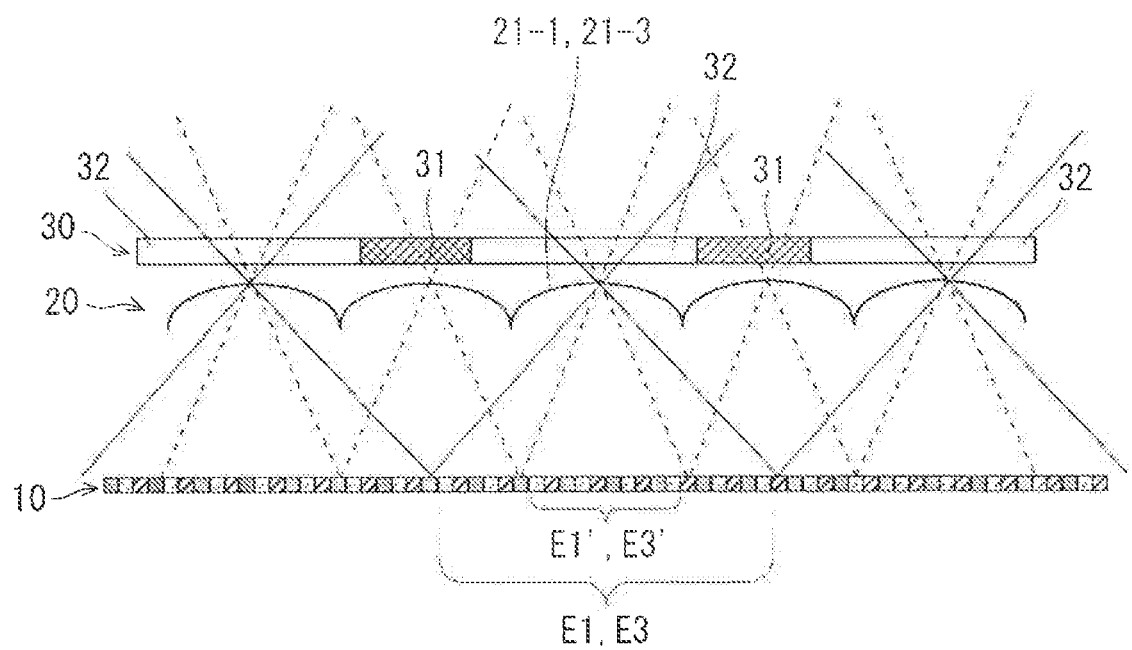
FIG. 28 is a diagram illustrating an operation of an active shutter according to an embodiment of the disclosure.

FIG. 28 is a diagram illustrating an operation of an active shutter according to an embodiment of the disclosure.

Figure 29:
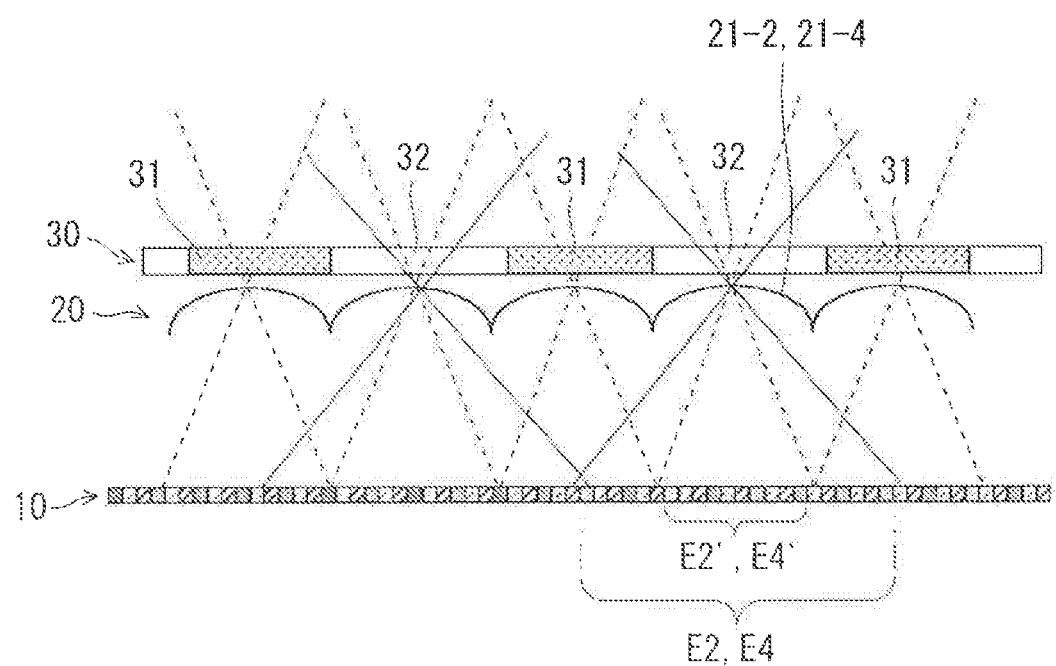
FIG. 29 is a diagram illustrating an operation of an active shutter according to an embodiment of the disclosure.

FIG. 29 is a diagram illustrating an operation of an active shutter according to an embodiment of the disclosure.

Figure 30:
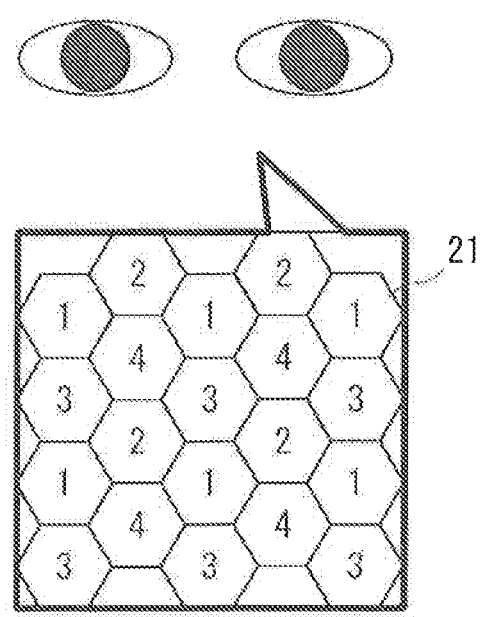
FIG. 30 is a diagram illustrating an operation of an active shutter according to an embodiment of the disclosure.

FIG. 30 is a diagram illustrating an operation of an active shutter according to an embodiment of the disclosure.

Referring to FIGS. 24 to 27, they show a state, in which the active shutter 30 shields the micro-lens 21 for a given time period. The time period is based on a display frame rate. Blocking of the active shutter 30 rapidly switches (for example, at 240 Hz) in the order from FIG. 24 to FIG. 27. FIG. 28 is a cross-sectional view of the active shutter 30 taken along line A-A' of FIGS. 24 and 26. Referring to FIG. 29, it is a cross-sectional view of the active shutter 30 taken along line B-B' of FIGS. 25 and 27.

Referring to FIG. 24, the active shutter 30 blocks the micro-lens 21 at a certain time (instance) t1. That is, in FIG. 24, hatched regions 31 block the light and regions 32 represented as "1" transmit the light transmitting through the micro-lens 21-1. Here, the micro-lens 21 adjacent to the micro-lens 21-1 is blocked. Therefore, a region of one element image transmitted through the micro-lens 21-1 may expand from the region (region E1' of FIG. 28) corresponding to one micro-lens 21 to a expanded region (element image E1 of FIGS. 24 and 28) including the region corresponding to the micro-lens 21 and a region corresponding to a part of the regions 31 being adjacent to the micro-lens 21 and blocking the light. This may be implemented by designing the micro-lens 21 so that the element image pitch (element image width) $E_p$ corresponds to a width of the expanded element image E1. This also applied to FIGS. 25, 26 and 27 that will be described below.

At a time t2 that is next timing (instance) of the time t1, the active shutter 30 blocks the micro-lens 21 as shown in FIG. 25. Therefore, the hatched regions 31 in FIG. 25 block the light, and the regions 32 represented as "2" transmit the light transmitting through a micro-lens 21-2. Here, the micro-lens 21 adjacent to the micro-lens 21-2 is blocked. Therefore, a region of one element image transmitted through the micro-lens 21-2 may expand from the region (region E2' of FIG. 29) corresponding to one micro-lens 21 to an expanded region (element image E2 of FIGS. 25 and 29) including the region corresponding to the micro-lens 21 and a region corresponding to a part of the regions 31 being adjacent to the micro-lens 21 and blocking the light.

Referring to FIG. 26, at a time t3 that is next timing (instance) of the time t2, the active shutter 30 blocks the micro-lens 21. Therefore, the hatched regions 31 in FIG. 26 block the light, and the regions 32 represented as "3" transmit the light transmitting through a micro-lens 21-3. Here, the micro-lens 21 adjacent to the micro-lens 21-3 is blocked. Therefore, a region of one element image transmitted through the micro-lens 21-3 may expand from the region (region E3' of FIG. 28) corresponding to one micro-lens 21 to an expanded region (element image E3 of FIGS. 26 and 28) including the region corresponding to the micro-lens 21 and a region corresponding to a part of the regions 31 being adjacent to the micro-lens 21 and blocking the light.

Referring to FIG. 27, at a time t4 that is next timing (instance) of the time t3, the active shutter 30 blocks the micro-lens 21. Therefore, the hatched regions 31 in FIG. 27 block the light, and the regions 32 represented as "4" transmit the light transmitting through a micro-lens 21-4. Here, the micro-lens 21 adjacent to the micro-lens 21-4 is blocked. Therefore, a region of one element image transmitted through the micro-lens 21-4 may expand from the region (region E4' of FIG. 29) corresponding to one micro-lens 21 to an expanded region (element image E4 of FIGS. 27 and 29) including the region corresponding to the micro-lens 21 and a region corresponding to a part of the regions 31 being adjacent to the micro-lens 21 and blocking the light.

Referring to FIG. 24, at next timing (instance) of the time t4, the active shutter 30 blocks the micro-lens 21 again. After that, the active shutter 30 repeatedly blocks the micro-lenses 21 in the order of FIG. 24 to FIG. 27. Also, referring to FIGS. 24 to 29, pixels 11 configuring the element images E1 to E4 at the times t1 to t4 are not independent from one another, but one pixel 11 may configure each of the plurality of element images E1 to E4.

Referring to FIG. 30, it is a diagram showing an image recognized by a user according to the operation of the active shutter 30. In FIG. 30, the micro-lens 21 (element image) to which "1" is attached corresponds to the micro-lens 21-1 (element image E1) shown in FIG. 24. Also, the micro-lens 21 (element image) to which "2" is attached corresponds to the micro-lens 21-2 (element image E2) shown in FIG. 25. Also, the micro-lens 21 (element image) to which "3" is attached corresponds to the micro-lens 21-3 (element image E3) shown in FIG. 26. Also, the micro-lens 21 (element image) to which "4" is attached corresponds to the micro-lens 21-4 (element image E4) shown in FIG. 27.

As described above, corresponding image may be displayed by the light transmitted through all of the micro-lenses 21 by switching the active shutter 30 time-divisionally. Here, the active shutter 30 and the pixels 11 are operated at high speed (e.g., tens of Hz such as 240 Hz), a human being may not sense the switching. Therefore, the user may recognize (misunderstand) the image as if the image is from the light from all the micro-lenses 21 as shown in FIG. 30. That is, the user may observe the 3D image with the number of 3D pixels as the number of the micro-lenses 21. That is, the user may recognize an image in which images transmitted in the processes of FIGS. 24, 25, 26, and 27 overlap one another. Therefore, according to the 3D image display apparatus and the 3D image display method of the embodiment of the disclosure, the user may recognize the element image with an expanded viewing zone by using the restricted number of pixels 11 without feeling a sense of incompatibility.

Figure 31:
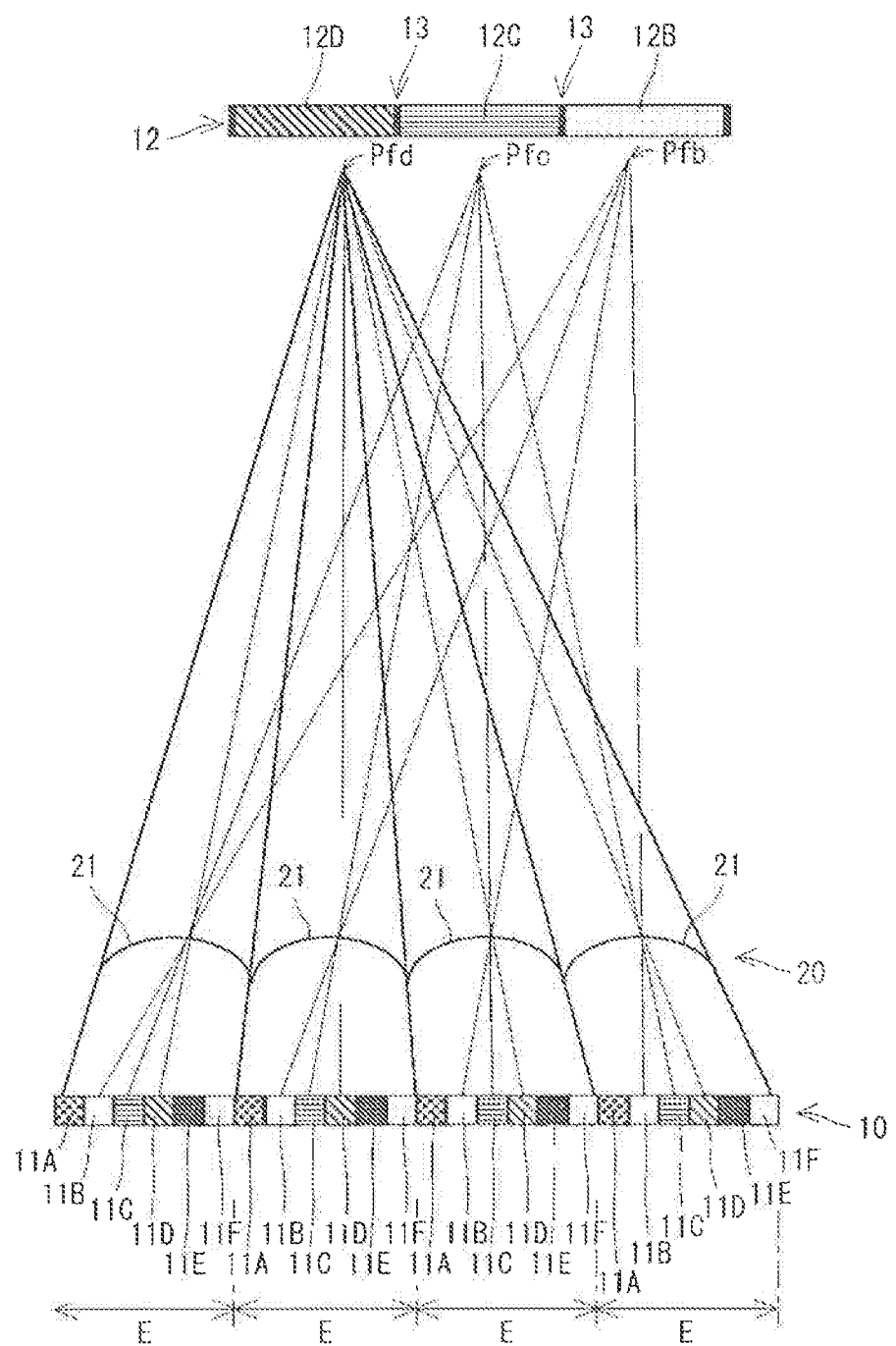
FIG. 31 is a diagram for describing generation of moire in a 3D image display apparatus according to a comparative example according to an embodiment of the disclosure.

FIG. 31 is a diagram for describing generation of moire in a 3D image display apparatus according to the comparative example according to an embodiment of the disclosure. A 3D image display apparatus according to the comparative example shown in FIG. 31 does not include the active shutter 30.

For convenience of description, the display portion 10 according to the comparative example referring to FIG. 31 includes six pixels 11A, 11B, 11C, 11D, 11E, and 11F in a transverse direction (horizontal direction) in each element image E. The pixels 11 with the same hatch correspond to pixels captured from the same position in the multi-viewpoint imaging apparatus group.

In the 3D image display apparatus 1 in which the display portion 10 is partially magnified by the exit pupil array 20 to make directivity, the cycle of the pixels and the periodical exit pupil array 20 (micro-lens array or pin-hole array) interfere with each other. That is, the pixel pitch and the lens pitch interfere with each other. Therefore, periodic large spots (moire) caused by a black matrix (BM) between pixels may be observed.

In more detail, at a point where the rays from the pixels 11, to which the directivity is given by the micro-lenses 21, cross one another, the repeated pixels 11 (rays from the plurality of corresponding pixels 11 arranged periodically) overlap one another and a light intensity distribution 12 based on a distribution of luminance of the pixels is shown. In the example of FIG. 31, repeated pixels 11B overlap one another at a point Pfb where the rays from the plurality of pixels 11B that are periodically arranged cross one another, and a light intensity distribution 12B based on the distribution of luminance of respective pixels is shown. Likewise, repeated pixels 11C overlap one another at a point Pfc where the rays from the plurality of pixels 11C that are periodically arranged cross one another, and a light intensity distribution 12C based on the distribution of luminance of respective pixels is shown. Also, repeated pixels 11D overlap one another at a point Pfd where the rays from the plurality of pixels 11D that are periodically arranged cross one another, and a light intensity distribution 12D based on the distribution of luminance of respective pixels is shown. Here, the screen may be uniformly observed from a viewing distance L (the point where the rays cross one another) in the design. However, when an observing distance exceeds the viewing distance L of the design, black matrixes 13 in the light intensity distribution 12 are recognized as spots on the screen.

For example, when a point Pfd where the rays cross one another is used as a viewpoint (observing position), a color corresponding to the light intensity distribution 12D is shown on entire screen. In addition, when a position shifted from the point Pfd where the rays cross one another in the viewing distance L direction is used as the viewpoint (observing position), the black matrix 13 between the light intensity distribution 12D and the light intensity distribution 12C is visible. Here, referring to FIG. 22, when the observing distance increases from the viewing distance L of the design, an apparent element image width $E_p'$ is shorter than a designed element image width $E_p$ due to a geometrical relationship. Also, when the observing distance decreases from the viewing distance L of the design, the apparent element image width $E_p'$ is longer than the designed element image width $E_p$ due to the geometrical relationship. According to the difference between the apparent element image width $E_p'$ and the designed element image width $E_p$ as described above, interference between the periodical pixel pitch and the periodical lens pitch occurs, and the moire is visualized.

Also, in a 3D image display apparatus only generating a horizontal parallax, a lens may be slanted or a pixel side may be slanted in order to disperse spots of the pixels in a vertical direction. However, in the 3D image display apparatus 1 according to the embodiment of the disclosure, visibility of the spots (moire) is reduced by using the active shutter 30 as described below. That is, the 3D image display apparatus 1 according to the embodiment of the disclosure may reduce the visibility of moire without using a specialized structure such as a unique pixel shape, optical dispersion structure, etc.

Figure 32:
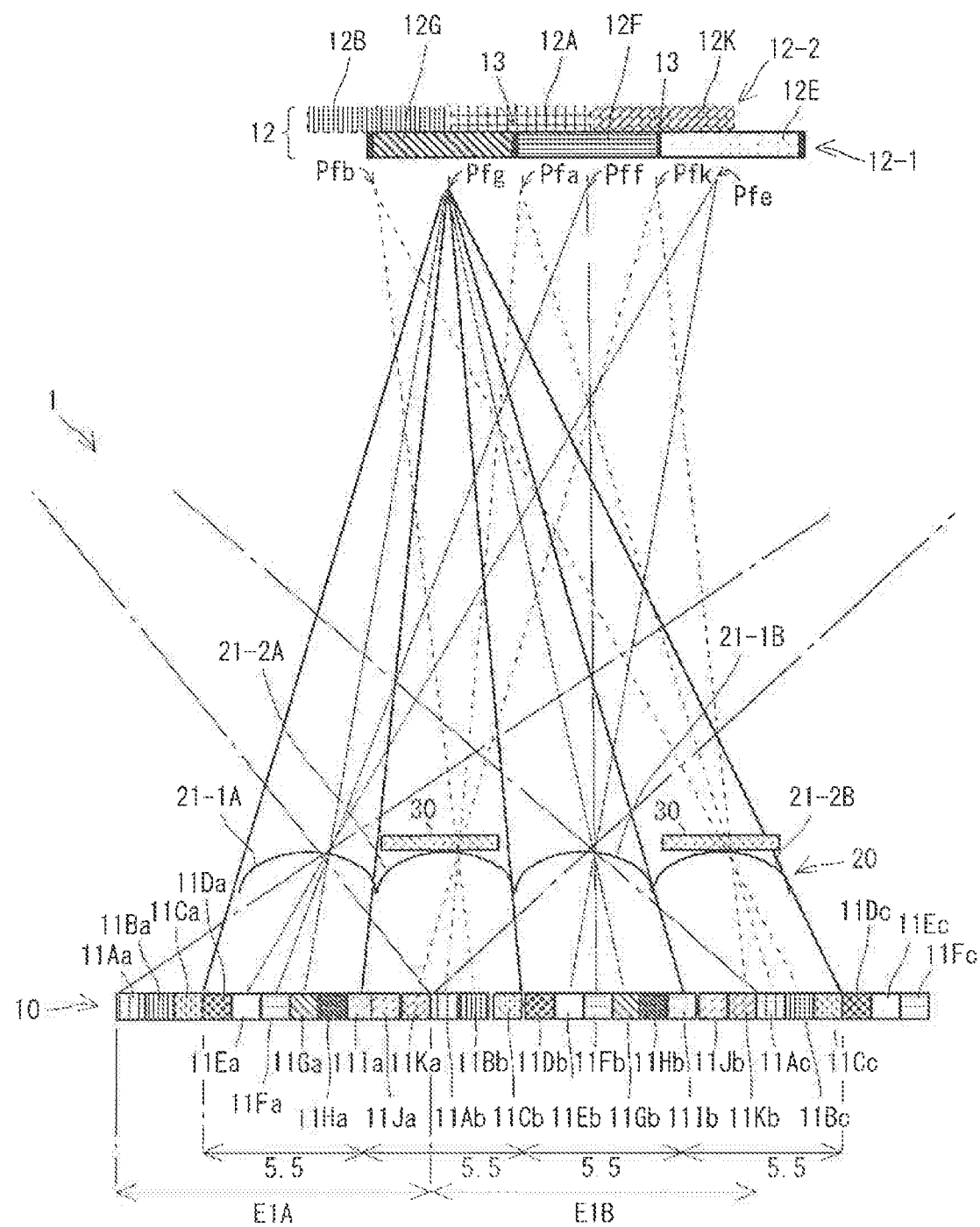
FIG. 32 is a diagram of a 3D image display apparatus according to an embodiment of the disclosure.

FIG. 32 is a diagram of a 3D image display apparatus according to an embodiment of the disclosure.

Figure 33:
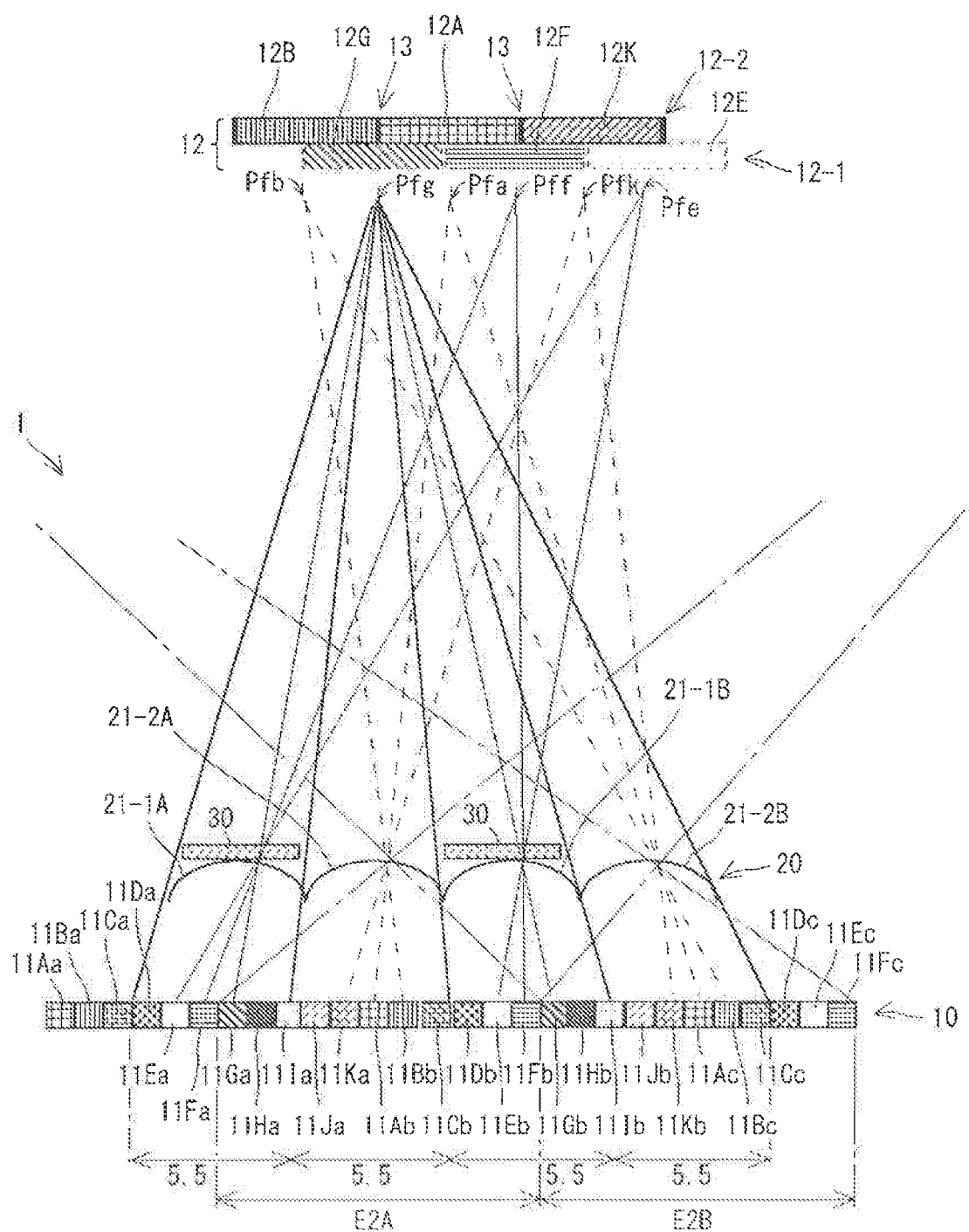
FIG. 33 is a diagram of a 3D image display apparatus according to an embodiment of the disclosure.

FIG. 33 is a diagram of a 3D image display apparatus according to an embodiment of the disclosure. For clarity of description, a horizontal direction (transverse direction) of the 3D image display apparatus 1 will be considered with reference to FIGS. 32 and 33. However, the structure shown in FIGS. 32 and 33 may correspond to a vertical direction (longitudinal direction) of the 3D image display apparatus 1. Also, for clarity of description, FIGS. 32 and 33 show that the active shutter 30 alternately blocks the micro-lens 21 at an odd-numbered column (odd-numbered column from left or right) of the micro-lens array and the micro-lens 21 at an even-numbered column (even-numbered column from left or right) of the micro-lens array.

Referring to FIGS. 32 and 33, four micro-lenses 21-1A, 21-2A, 21-1B, and 21-2B are shown. The micro-lenses 21-1A and 21-1B are the micro-lenses 21 at the odd-numbered columns, and the micro-lenses 21-2A and 21-2B are the micro-lenses 21 at the even-numbered columns.

Referring to FIGS. 32 and 33, the micro-lens 21-1A and the micro-lens 21-2A are adjacent to each other. Also, the micro-lens 21-2A and the micro-lens 21-1B are adjacent to each other. Also, the micro-lens 21-1B and the micro-lens 21-2B are adjacent to each other. In FIG. 32, the micro-lens 21-2A and the micro-lens 21-2B are blocked by the active shutter 30. In addition, in FIG. 33, the micro-lens 21-1A and the micro-lens 21-1B are blocked by the active shutter 30.

The display portion 10 includes neighboring pixels 11Aa, 11Ba, 11Ca, 11Da, 11Ea, 11Fa, 11Ga, 11Ha, 11Ia, 11Ja, and 11Ka. Also, the display portion 10 includes neighboring pixels 11Ab, 11Bb, 11Cb, 11Db, 11Eb, 11Fb, 11Gb, 11Hb, 11Ib, 11Jb, and 11Kb. Also, the display portion 10 includes neighboring pixels 11Ac, 11Bc, 11Cc, 11Dc, 11Ec, and 11Fc. The pixels 11Ka and 11Ab are adjacent to each other and the pixels 11Kb and 11Ac are adjacent to each other.

In the 3D image display apparatus 1 (display portion 10) according to the embodiment of the disclosure, a pixel width covered by one micro-lens 21 corresponds to a length of N+½ (N is one or greater integer) pixels 11. In the examples of FIGS. 32 and 33, the pixel width covered by one micro-lens 21 corresponds to a length of 5.5 pixels 11.

As described above, in the embodiment of the disclosure, a region of one element image E is expanded to a part of the region corresponding to the micro-lens 21 blocked by the active shutter 30.

Therefore, according to the above configuration, a width of the element image E transmitted through one micro-lens 21 corresponds to $2 \times (N+½) = (2N+1)$ pixels 11. That is, the width of the element image E corresponds to a length of odd-number pixels 11 constituting the display portion 10. In the examples of FIGS. 32 and 33, the width of one element image corresponds to the length of eleven pixels 11. By arranging the pixels 11 as above, the element images of adjacent micro-lenses 21 are configured to overlap one another by half the widths thereof.

In addition, an element image E1A corresponding to the micro-lens 21-1A that is not blocked by the active shutter 30 in FIG. 32 corresponds to the pixels 11Aa, 11Ba, 11Ca, 11Da, 11Ea, 11Fa, 11Ga, 11Ha, 11Ia, 11Ja, and 11Ka. Also, the element image E1B corresponding to the micro-lens 21-1B that is not blocked by the active shutter 30 corresponds to the pixels 11Ab, 11Bb, 11Cb, 11Db, 11Eb, 11Fb, 11Gb, 11Hb, 11Ib, 11Jb, and 11Kb. Also, the pixels 11 with the same hatch correspond to the pixels photographed from the same positions in the multi-viewpoint imaging apparatus group (this also applies to FIGS. 37 and 38 that will be described later).

In addition, in FIG. 33, an element image E2A corresponding to a micro-lens 21-2A that is not blocked by the active shutter 30 in FIG. 33 corresponds to pixels 11Ga, 11Ha, 11Ia, 11Ja, 11Ka, 11Ab, 11Bb, 11Cb, 11Db, 11Eb, and 11Fb.

Also, the element image E2B corresponding to the micro-lens 21-2B that is not blocked by the active shutter 30 corresponds to the pixels 11Gb, 11Hb, 11Ib, 11Jb, 11Kb, 11Ac, 11Bc, 11Cc, 11Dc, 11Ec, and 11Fc.

As described above, at the point where rays from the pixels 11, to which directivity is granted by the micro-lenses 21, the repeated pixels 11 (rays from the plurality of corresponding pixels 11 that are periodically arranged) overlap one another, and thus, the light intensity distribution 12 based on a distribution of luminance of the pixels is shown. In the example of FIG. 32, at the point Pfg where rays from the pixels 11G (11Ga and 11Gb) in the element image E1 (E1A and E1B), the repeated pixels 11G overlap each other, and a light intensity distribution 12G based on a distribution of luminance of the pixels is shown. Also, at the point Pff where rays from the pixels 11F (11Fa and 11Fb) in the element image E1 (E1A and E1B), the repeated pixels 11F overlap each other, and a light intensity distribution 12F based on a distribution of luminance of the pixels is shown. Also, at the point Pfe where rays from the pixels 11E (11Ea and 11Eb) in the element image E1 (E1A and E1B), the repeated pixels 11E overlap each other, and a light intensity distribution 12E based on a distribution of luminance of the pixels is shown.

Referring to FIG. 33, at the point Pfb where rays from the pixels 11B (11Bb and 11Bc) in the element image E2 (E2A and E2B), the repeated pixels 11B overlap each other, and a light intensity distribution 12B based on a distribution of luminance of the pixels is shown. Also, at the point Pfa where rays from the pixels 11A (11Ab and 11Ac) in the element image E2 (E2A and E2B), the repeated pixels 11A overlap each other, and a light intensity distribution 12A based on a distribution of luminance of the pixels is shown. Also, at the point Pfk where rays from the pixels 11K (11Ka and 11Kb) in the element image E2 (E2A and E2B), the repeated pixels 11K overlap each other, and a light intensity distribution 12K based on a distribution of luminance of the pixels is shown.

As described above, the width of the element image E is configured to correspond to a length of odd-number pixels 11 configuring the display portion 10, and thus, when the active shutter 30 is switched, the light intensity distribution 12 based on the distribution of luminance of the pixels 11 at the point where the rays from the pixels 11 cross one another is shifted by half phase. Referring to FIGS. 32 and 33, a position where a light intensity distribution group 12-1 including the light intensity distributions 12G, 12F, and 12E shown in FIG. 32 is represented and a position where a light intensity distribution group 12-2 including the light intensity distributions 12B, 12A, and 12K shown in FIG. 33 are shifted from each other by half phase.

That is, a center in each of the light intensity distributions 12G, 12F, and 12E included in the light intensity distribution group 12-1 corresponds to the black matrix 13 among the light intensity distributions 12B, 12A, and 12K included in the light intensity distribution group 12-2. For example, the center of the light intensity distribution 12G corresponds to the location of the black matrix 13 between the light intensity distribution 12B and the light intensity distribution 12A. Also, the center of the light intensity distribution 12F corresponds to the location of the black matrix 13 between the light intensity distribution 12A and the light intensity distribution 12K. Also, the center of the light intensity distribution 12A corresponds to the location of the black matrix 13 between the light intensity distribution 12G and the light intensity distribution 12F. Also, the center of the light intensity distribution 12K corresponds to the location of the black matrix 13 between the light intensity distribution 12F and the light intensity distribution 12E.

As such, locations of showing the black matrix 13 when the micro-lens 21 of the odd-numbered column is blocked and when the micro-lens 21 of the even-numbered column are shifted from each other by half phase. That is, when the micro-lens 21 of the odd-numbered column is blocked and when the micro-lens 21 of the even-numbered column, the period of the pixels and the periodical exit pupil array 20 (micro-lens array or pin-hole array) interfering with each other are shifted from each other by half phase. Therefore, the phase of the intensity of moire observed due to the black matrix 13 is also shifted by half. As such, the visibility of the moire in the 3D image display apparatus 1 may be reduced as described below.

Figure 34:
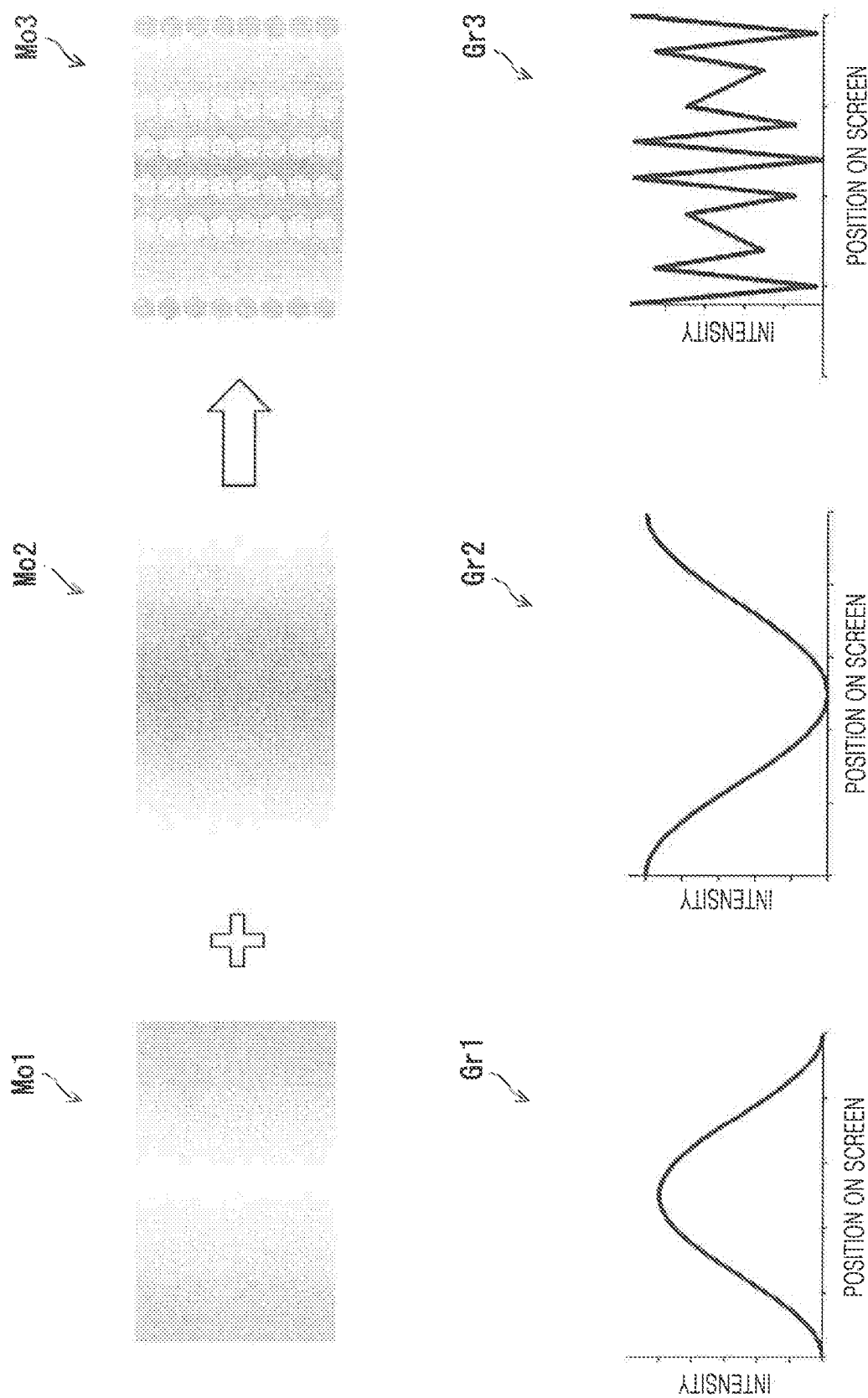
FIG. 34 is a diagram for describing a principle of reducing visibility of moire in a 3D image display apparatus according to an embodiment of the disclosure.

FIG. 34 is a diagram for describing a principle of reducing visibility of moire in the 3D image display apparatus 1 according to an embodiment of the disclosure.

Referring to FIG. 34, it shows an example, in which an observing position is shifted in the viewing distance L from the point Pfg where the rays cross one another in FIGS. 32 and 33. In this example, the observing position is the same in FIGS. 32 and 33.

Referring to FIG. 32, a location right under the observing position corresponds to the center of the light intensity distribution 12G, and thus, looks bright. However, towards opposite ends of the light intensity distribution 12G away from the location under the observing position in the horizontal direction, it looks dark because of the black matrix 13. A graph Gr1 denotes a light intensity with respect to a position on a screen in the example of FIG. 32. As shown in the graph Gr1, in the example of FIG. 32, the light intensity is high around the center of the screen and reduces towards the opposite ends of the screen. Therefore, as shown in a moire distribution Mo1, the moire that is bright around the center of the screen and becomes dark towards the opposite ends of the screen is visible.

Referring to FIG. 33, the location right under the observing position corresponds to the black matrix 13 between the light intensity distribution 12B and the light intensity distribution 12A, and looks dark. However, the black matrix 13 less affects away from the location right under the observing position in the horizontal direction, and thus, the screen looks bright. A graph Gr2 denotes a light intensity with respect to a position on a screen in the example of FIG. 33. Like the graph Gr2, the light intensity is low around the center of the screen, and is increased towards the opposite ends of the screen. Therefore, as shown in a moire distribution Mo2, the moire that is dark around the center of the screen and becomes brighter towards the opposite ends of the screen is visible.

As described above, in the 3D image display apparatus 1 according to the embodiment of the disclosure, the active shutter 30 blocks or transmits the ray from the display portion 10 for every column of the micro-lenses 21. In addition, the active shutter 30 alternately transmits and blocks the ray with respect to one micro-lens 21. As such, the user may visualize the moire in which the moire distribution Mo1 and the moire distribution Mo2 overlap each other. Therefore, the user may recognize dispersed spots as shown in a moire distribution Mo3. A graph Gr3 denotes a light intensity with respect to the moire distribution Mo3. Therefore, in the screen visible to the user, the light intensity is dispersed.

As described above, whenever the neighboring micro-lenses 21 are blocked alternately, the locations showing the black matrix 13 are shifted by half phase. Therefore, the phase of the intensity of moire observed due to the black matrix 13 is also shifted by half. As such, the spots are overlapped as the user recognizes, and the phases of the intensity periods are shifted by half and the light intensities may be offset by each other. Therefore, the user may recognize the light of averaged intensity with respect to the position of the screen. Also, when there are spots, the spots are of the finest spatial frequency that may be seen through the micro-lens 21, and thus, it may be difficult for a human being to recognize the spots. Therefore, in the 3D image display apparatus 1 according to the embodiment of the disclosure, the recognition of moire may be reduced without using a specified pixel shape, an optical dispersion structure, etc.

Also, as described above, in the 3D image display apparatus 1 according to the embodiment of the disclosure, the micro-lens 21 of the odd-numbered column and the micro-lens 21 of the even-numbered column display the element images at different timings. In addition, the width of the element image consisting of the pixels corresponding to the micro-lens 21 that is not blocked by the active shutter 30 and the pixels corresponding to the micro-lens 21 blocked by the active shutter 30 corresponds to a length of odd number pixels, that is, an integer number of pixels (2N+1; 11 pixels in the above-described example). As such, the multi-viewpoint image may be effectively (not incompletely) seen with the element images.

Next, a relation between the multi-viewpoint image and the element image will be described below.

Figure 35:
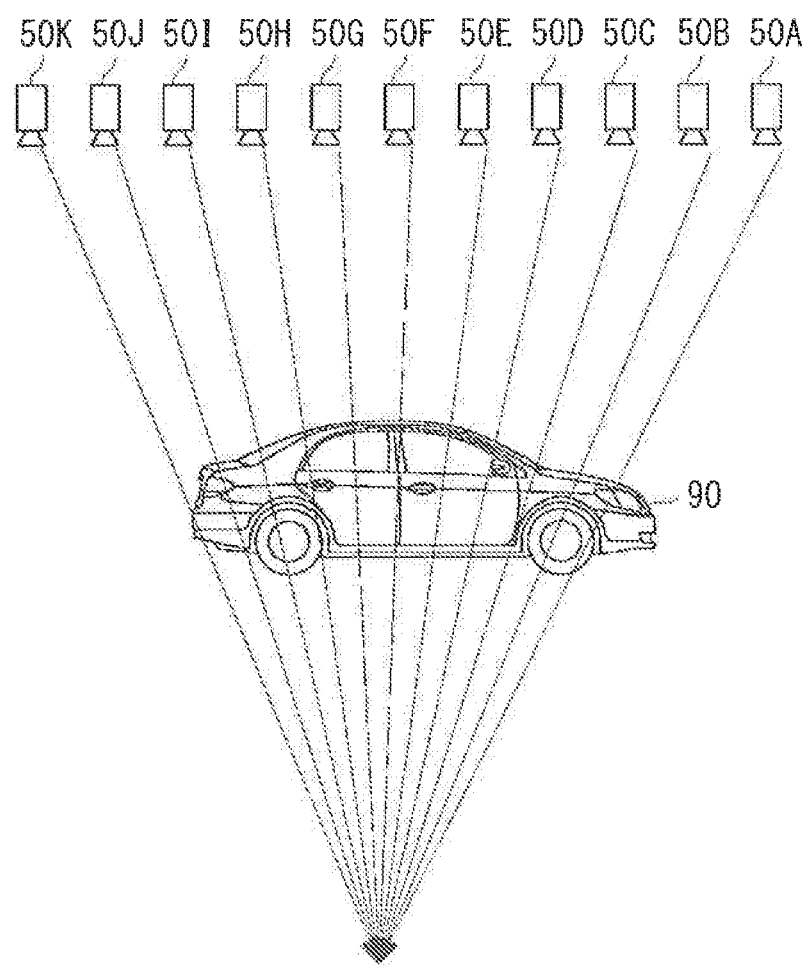
FIG. 35 is a diagram for describing a relation between a multi-viewpoint image and an element image according to an embodiment of the disclosure.
Figure 36:
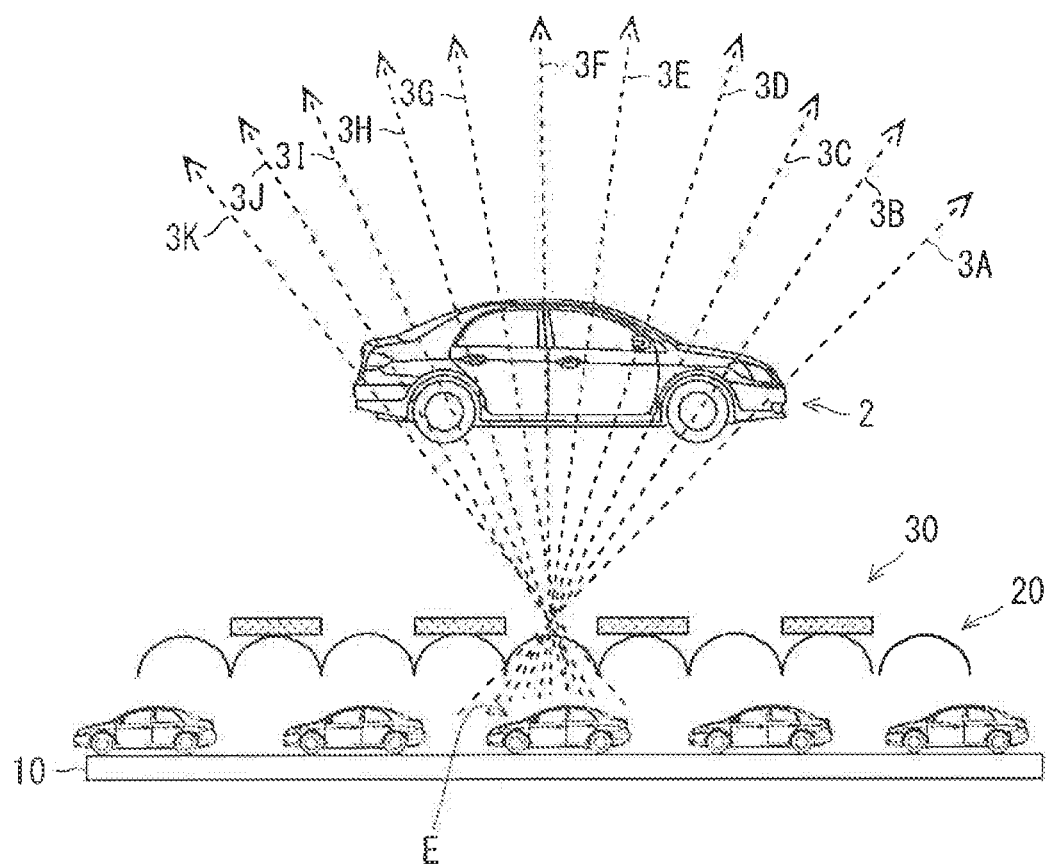
FIG. 36 is a diagram for describing a relation between a multi-viewpoint image and an element image according to an embodiment of the disclosure.

FIGS. 35 and 36 are diagrams for describing the relationship between a multi-viewpoint image and an element image according to an embodiment of the disclosure. Hereinafter, the horizontal direction will be considered for clarity of description.

Referring to FIG. 35, it is a diagram for describing a method of capturing multi-viewpoint images. Multi-viewpoint images of an object 90 are captured by cameras 50, the number of which corresponds to the number of pixels corresponding to a width of an element image. In this example, the width of the element image corresponds to the length of eleven pixels, and thus, multi-viewpoint images from eleven directions are necessary. Therefore, the multi-viewpoint images of the object 90 are captured by cameras 50A to 50K from eleven directions.

Referring to FIG. 36, it is a diagram of a 3D image reproduced by using the multi-viewpoint images. As described above, the processor 40 (see FIG. 4) receives inputs of multi-viewpoint images from the cameras 50A to 50K. The processor 40 arranges the images from the cameras 50A to 50K as a plurality of element images E. Accordingly, a 3D image 2 is reproduced by rays 3A to 3K from the element image E, the rays 3A to 3K corresponding to the cameras 50A to 50K. Also, as well as the photographing, computer graphics require the cameras 50, the number of which corresponds to the number of pixels corresponding to the element image width.

Figure 37:
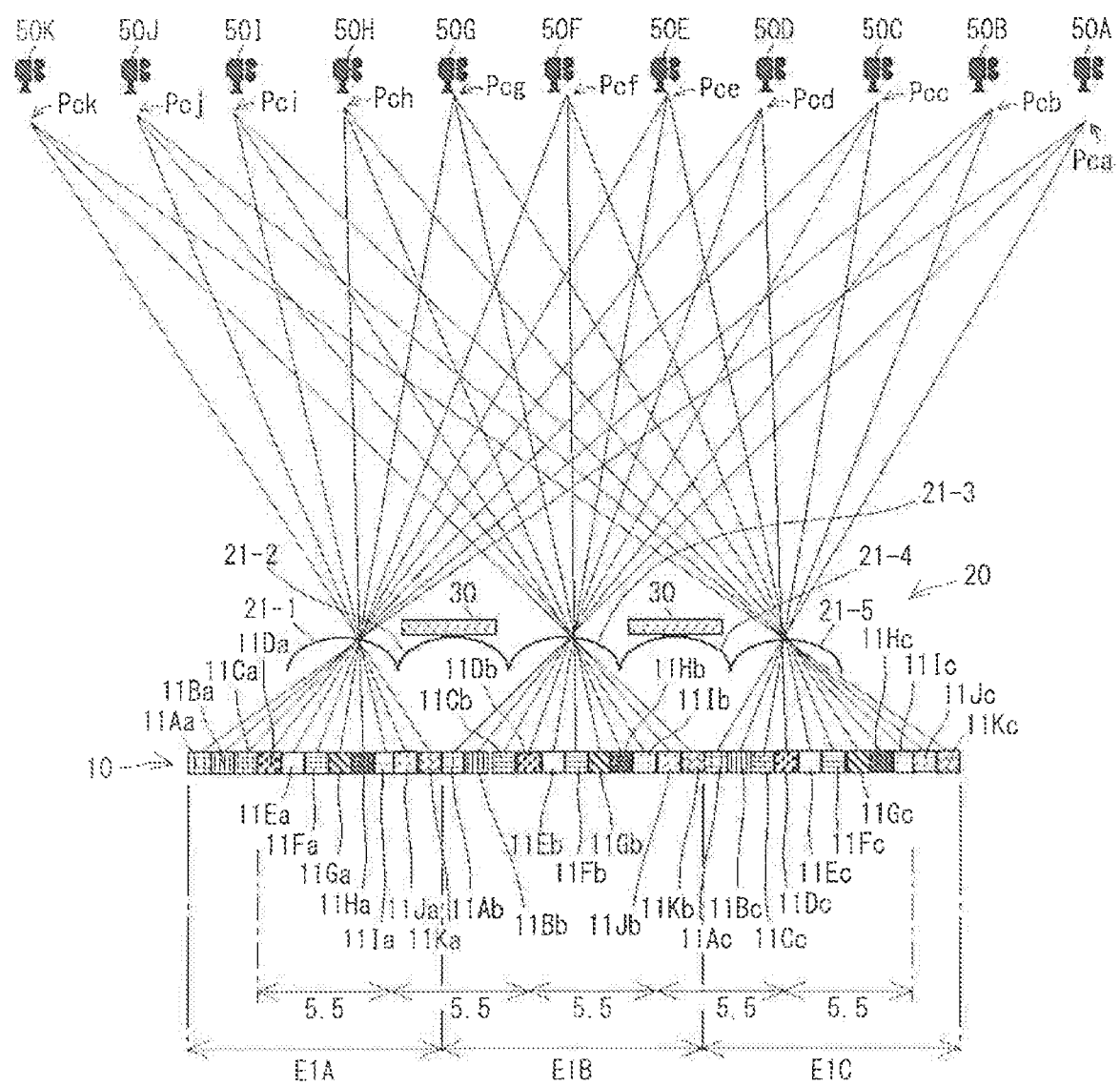
FIG. 37 is a diagram for describing a relation between a camera and an element image according to an embodiment of the disclosure.
Figure 38:
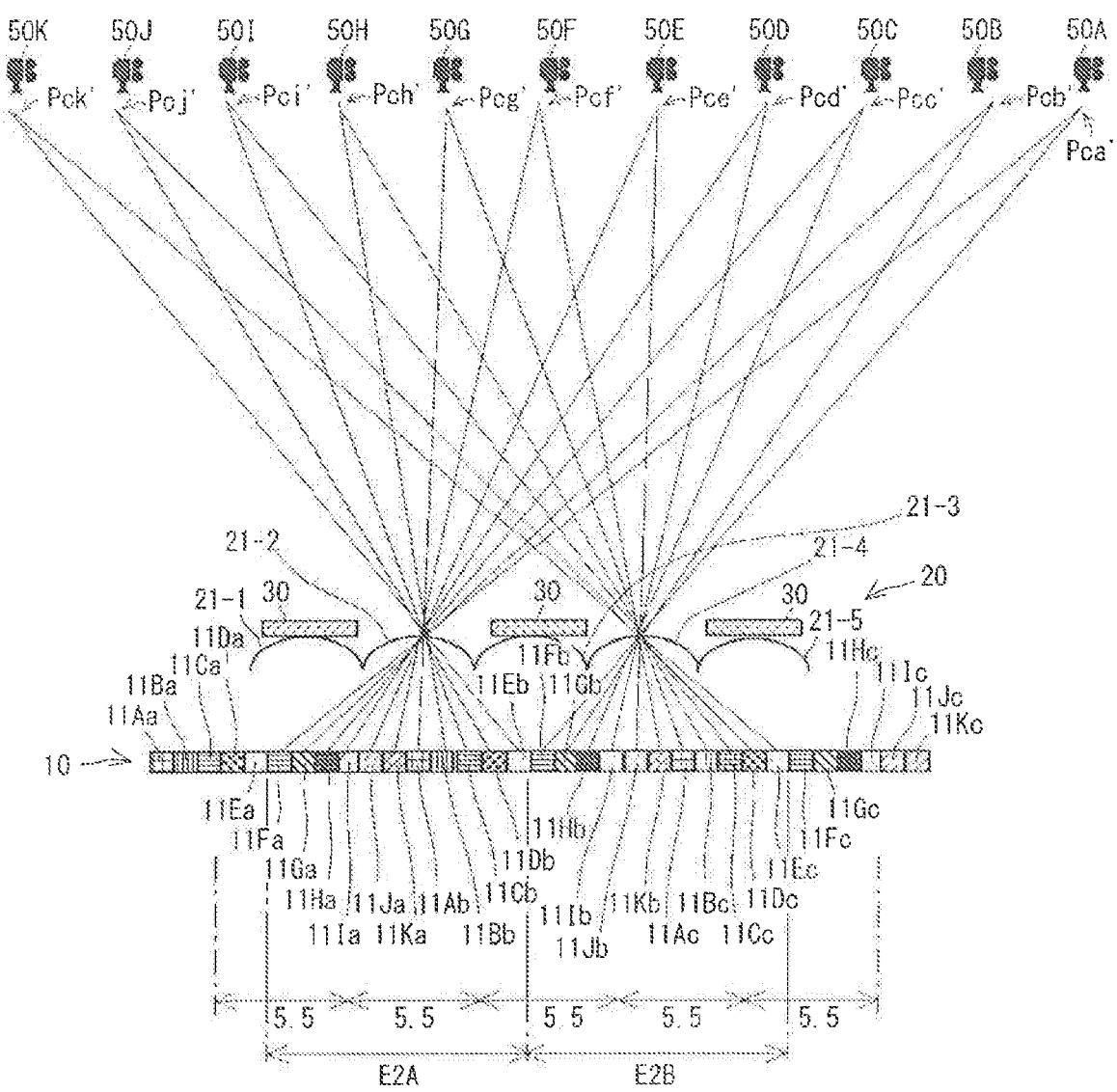
FIG. 38 is a diagram for describing a relation between a camera and an element image according to an embodiment of the disclosure.

FIGS. 37 and 38 are diagrams for describing a relationship between the cameras 50 and the element image E according to various embodiments of the disclosure.

Referring to FIG. 37, it shows a state in which micro-lenses 21-1, 21-3, and 21-5 of odd-numbered columns are not blocked (that is, the micro-lenses 21-1, 21-3, and 21-5 in the odd-numbered columns transmit light). FIG. 38 shows a state in which micro-lenses 21-2 and 21-4 of even-numbered columns are not blocked (that is, the micro-lenses 21-2 and 21-4 of the even-numbered columns transmit light).

Referring to FIG. 37, an element image E1A transmitted through the micro-lens 21-1 corresponds to pixels 11Aa to 11Ka. An element image E1B transmitted through the micro-lens 21-3 corresponds to pixels 11Ab to 11Kb. An element image E1C transmitted through the micro-lens 21-5 corresponds to pixels 11Ac to 11Kc.

Referring to FIG. 38, an element image E2A transmitted through the micro-lens 21-2 corresponds to pixels 11Fa to 11Ka and 11Ab to 11Eb. An element image E2B transmitted through the micro-lens 21-4 corresponds to pixels 11Fb to 11Kb and 11Ac to 11Ec.

Referring to FIG. 37 (the micro-lenses 21 of the odd-numbered columns transmitting light), cameras 50A to 50K respectively correspond to the pixels 11A to 11K. Also, in FIG. 38 (the micro-lenses 21 of the even-numbered columns transmitting light), the cameras 50A to 50F and 50G to 50K respectively correspond to the pixels 11F to 11K and 11A to 11F. As described above, in the 3D image display apparatus 1 according to the embodiment of the disclosure, each of the cameras 50 corresponds to different pixels 11 when the light is transmitted through the micro-lens 21 in the odd-numbered column and when the light is transmitted through the micro-lens 21 of the even-numbered column.

In an integral photography method, a 3D image without distortion may be seen by matching a photographed environment with a displayed environment. Therefore, at a point where the rays transmitted through each micro-lens 21 from the pixels 11 each configuring each of the element image E cross one another, the camera 50 corresponding to the pixels 11 is arranged.

According to the embodiment of the disclosure, as shown in FIGS. 32 and 33, the points where the rays cross one another are shifted from each other depending on whether the micro-lens 21 of the odd-numbered column transmits the light or the micro-lens 21 of the even-numbered column transmits the light. For example, a location of the point Pfg where the rays cross one another is different from that of the point Pfb where the rays cross one another. Therefore, the location of the camera 50 varies depending on whether the multi-viewpoint image (element image) corresponding to the micro-lens 21 of the odd-numbered column is captured or the multi-viewpoint image (element image) corresponding to the micro-lens 21 of the even-numbered column is captured. Accordingly, a variation in the direction of light increases, and quality of displaying the 3D image may be improved.

Also, according to the embodiment of the disclosure, the micro-lenses 21 in the odd-numbered column and the micro-lenses 21 in the even-numbered column are alternately blocked by the active shutter 30. That is, the active shutter 30 blocks an exit pupil (micro-lens 21) adjacent to an exit pupil (micro-lens 21) transmitting the light. Therefore, there is no need to capture images by using different cameras 50 in the cases when the multi-viewpoint image (element image) corresponding to the micro-lens 21 of the odd-numbered column is captured and when the multi-viewpoint image (element image) corresponding to the micro-lens 21 of the even-numbered column is captured.

Referring to FIG. 37, when the multi-viewpoint images (element image) corresponding to the micro-lenses 21 of the odd-numbered columns are captured, the cameras 50A to 50K capture the multi-viewpoint images at respective positions Pca to Pck. In addition, referring to FIG. 38, when the multi-viewpoint images (element image) corresponding to the micro-lenses 21 of the even-numbered columns, the cameras 50A to 50K are moved respectively to positions Pca' to Pck' and capture the multi-viewpoint images at the positions Pca' to Pck'.

As described above, by switching the micro-lenses 21 that are blocked by the active shutter 30, a lot of multi-viewpoint images (element image) may be captured without increasing the number of cameras 50. That is, in order to the same number of multi-viewpoint images (element image), the number of cameras 50 may be reduced.

Also, when a lot of cameras photographing at the same time are set in computer graphics, a load of generating multi-viewpoint images increases. In addition, in the embodiment of the disclosure, the multi-viewpoint images are captured by the same cameras in each field, and thus, the load of generating the multi-viewpoint images may be reduced.

Also, in the above embodiment of the disclosure, arrangement of rays in the horizontal direction is described, but arrangement of the rays in the vertical direction may be determined according to the shape of the exit pupil array 20 (exit pupil). That is, because the exit pupil has a regular hexagon shape, the exit pupils (micro-lenses 21) are designed with optimized lens pitch in the horizontal direction and then the rays are arranged in the vertical direction according to the lens pitch of the horizontal direction.

According to the disclosure, the 3D image display apparatus, the 3D image display method, and the 3D image generating and displaying system may increase the viewing zone of the 3D images.

According to the disclosure, the 3D image display apparatus, the 3D image display method, and the 3D image generating and displaying system may restrain a user from recognizing moire when watching the 3D images.

While the 3D image display apparatus, the 3D image display method, and the 3D image generating and displaying system have been particularly shown and described with reference to various embodiments thereof, it will be understood by those of ordinary skill in the art that various changes in form and details may be made therein without departing from the spirit and scope of the disclosure as defined by the appended claims and their equivalents.

What is claimed is:

1. A three-dimensional (3D) image display apparatus comprising:
    a display portion configured to display a plurality of element images;
    an exit pupil array comprising a plurality of exit pupils arranged two-dimensionally above the display portion, the exit pupil array configured to control directions of rays that exit from the plurality of element images;
    an active shutter arranged on or under the exit pupil array, and configured to transmit or block rays through each of the plurality of exit pupils; and
    a processor configured to:
        generate the plurality of element images from a multi-viewpoint image group,
        arrange each of the plurality of element images on an expanded region including a first region and a second region, the first region corresponding to a first exit pupil for rays transmitted by the active shutter, and the second region corresponding to a second exit pupil for rays blocked by the active shutter, and
        synchronously display the plurality of element images on the display portion while transmitting or blocking of the rays,
    wherein the display portion comprises a display area displaying the plurality of element images,
    wherein a plurality of 3D image observing areas are provided in directions substantially perpendicular to sides of the display area, respectively,
    wherein the plurality of element images each include a plurality of partial element images, and
    wherein the processor is further configured to arrange the plurality of partial element images to correspond to the plurality of 3D image observing areas.

2. The 3D image display apparatus of claim 1, wherein the active shutter is further configured to block the rays through at least one of every column or every row of the plurality of exit pupils.

3. The 3D image display apparatus of claim 1, wherein the processor is further configured to arrange the plurality of partial element images according to an aspect ratio of the display area.

4. The 3D image display apparatus of claim 1, wherein each of the partial element images includes a triangular shape or a rectangular shape.

5. The 3D image display apparatus of claim 1, wherein the plurality of exit pupils are each formed in a regular hexagon shape, and the exit pupil array includes a honeycomb structure including the plurality of exit pupils.

6. The 3D image display apparatus of claim 1, wherein the exit pupil array comprises a micro-lens array in which micro-lenses are arranged.

7. The 3D image display apparatus of claim 6, wherein a radius of curvature in each of the micro-lenses and a pitch of the micro-lenses are equal to each other.

8. The 3D image display apparatus of claim 6, wherein the micro-lenses comprise a flat convex shape, a radius of curvature r of the micro-lens satisfies an equation $r=d/(1+Pp/L_p) \times (n-1)$, where d denotes a distance between the micro-lens and a pixel, Pp denotes a pixel pitch, $L_p$ denotes a micro-lens pitch, and n denotes a refractive index of the micro-lens.

9. The 3D image display apparatus of claim 1, wherein the exit pupil array comprises a pin-hole array in which pin holes are arranged.

10. The 3D image display apparatus of claim 9, wherein a diameter of each of the pin holes and a pitch of the pin holes are substantially equal to each other.

11. The 3D image display apparatus of claim 9, wherein each of pixels included in the display portion comprises:
    sub-pixels configured to represent colors, and
    an opening width in each of the pin holes corresponds to a size of the sub-pixels.

12. The 3D image display apparatus of claim 1, wherein an area of the exit pupil array is substantially equal to an area of a display area in the display portion.

13. The 3D image display apparatus of claim 1, wherein a pitch of a blocking region blocking the rays in the active shutter is equal to or less than a pitch of the plurality of exit pupils.

14. The 3D image display apparatus of claim 1, wherein a width of an element image arranged on the expanded region corresponds to a length of odd number pixels included in the display portion.

15. The 3D image display apparatus of claim 14, wherein a transverse width of the element image arranged on the expanded region corresponds to a length of odd number pixels included in the display portion.

16. The 3D image display apparatus of claim 14,
wherein each of pixels included in the display portion comprises sub-pixels that are configured to represent colors, and
wherein the plurality of exit pupils are configured to allow all of the sub-pixels of a pixel corresponding to an exit pupil to be observed at a predetermined viewing distance.

17. The 3D image display apparatus of claim 14, wherein the active shutter is further configured to block an exit pupil next to the first exit pupil.

18. A method of a three-dimensional (3D) image display apparatus, comprising:
generating a plurality of element images from a multi-viewpoint image group;
arranging the plurality of element images on an expanded region including a first region and a second region, the first region corresponding to a first exit pupil from an exit pupil array for rays transmitted by an active shutter, and the second region corresponding to a second exit pupil for rays blocked by the active shutter; and
synchronously displaying the plurality of element images on a display portion while transmitting or blocking the rays from the plurality of element images,
wherein the exit pupil array comprises a plurality of exit pupils two-dimensionally arranged above the display portion for controlling directions of rays that exit from the plurality of element images,
wherein the active shutter is arranged on or under the exit pupil array and configured to transmit or block rays through each of the plurality of exit pupils,
wherein the display portion comprises a display area displaying the plurality of element images,
wherein a plurality of 3D image observing areas are provided in directions substantially perpendicular to sides of the display area, respectively,
wherein the plurality of element images each include a plurality of partial element images, and
wherein the method further comprising arranging the plurality of partial element images to correspond to the plurality of 3D image observing areas.

19. The method of claim 18, further comprising:
controlling the active shutter to transmit or block the rays from the exit pupil during a period,
wherein the period is based on a display frame rate.

* * * * *